United States Patent
Julien et al.

(10) Patent No.: US 8,509,616 B2
(45) Date of Patent: Aug. 13, 2013

(54) DEVICES, SYSTEMS AND METHODS FOR RUN-TIME REASSIGNMENT OF A PHY TO MAC DEVICES INTERCONNECT

(75) Inventors: Martin Julien, Laval (CA); Robert Brunner, Montreal (CA); Stephane Lessard, Mirabel (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 232 days.

(21) Appl. No.: 13/165,978

(22) Filed: Jun. 22, 2011

(65) Prior Publication Data

US 2012/0328289 A1 Dec. 27, 2012

(51) Int. Cl.
*H04B 10/00* (2013.01)

(52) U.S. Cl.
USPC .................. 398/45; 398/72; 398/141; 398/17

(58) Field of Classification Search
USPC ........................ 398/17, 25, 45–73, 140, 141
See application file for complete search history.

(56) References Cited

U.S. PATENT DOCUMENTS

| | | | |
|---|---|---|---|
| 7,548,548 B2 * | 6/2009 | Rakib et al. | 370/419 |
| 8,155,136 B2 * | 4/2012 | Lin et al. | 370/420 |
| 8,204,074 B2 * | 6/2012 | Pantelias | 370/463 |
| 8,238,257 B2 * | 8/2012 | Huff | 370/248 |
| 8,355,358 B2 * | 1/2013 | Bajic | 370/315 |
| 2002/0172195 A1 * | 11/2002 | Pekkala et al. | 370/360 |
| 2003/0043435 A1 * | 3/2003 | Oettinger et al. | 359/159 |
| 2007/0147835 A1 * | 6/2007 | Kim et al. | 398/71 |
| 2007/0165663 A1 * | 7/2007 | Aloni et al. | 370/420 |
| 2008/0069004 A1 * | 3/2008 | Huff | 370/248 |
| 2008/0075462 A1 * | 3/2008 | Kashima | 398/58 |
| 2008/0259786 A1 * | 10/2008 | Gonda | 370/218 |
| 2010/0189440 A1 | 7/2010 | Julien et al. | |
| 2011/0085197 A1 * | 4/2011 | Kim | 358/1.15 |
| 2011/0229131 A1 * | 9/2011 | Izenberg et al. | 398/45 |
| 2012/0251106 A1 * | 10/2012 | Valiveti et al. | 398/45 |
| 2012/0275325 A1 * | 11/2012 | Rikitake et al. | 370/252 |
| 2012/0328289 A1 * | 12/2012 | Julien et al. | 398/45 |

OTHER PUBLICATIONS

Gustlin, Mark—Cisco: XL/CGMII and RS Proposal; May 2008; Munich, Germany; 11 pages.
International Search Report for PCT/IB2012/053094 with mailing date of Jan. 28, 2013; 5 pages.

* cited by examiner

*Primary Examiner* — Agustin Bello
(74) *Attorney, Agent, or Firm* — Ericsson Canada Inc.; Alex Nicolaescu

(57) ABSTRACT

Devices, systems and methods for run-time reassignment of the interconnection between devices pertaining to a Physical (PHY) layer and devices pertaining to a Media Access Control (MAC) layer, with no packet loss or with at most one packet lost are provided. The strategies employed by these devices, systems and methods used REMOTE FAULT, PAUSE and IDLE PATTERN messages. The devices may be interconnected via a reconfigurable optical crossbar.

36 Claims, 17 Drawing Sheets

DEVICES, SYSTEMS AND METHODS FOR RUN-TIME REASSIGNMENT OF A PHY TO MAC DEVICES INTERCONNECT

TECHNICAL FIELD

The present invention generally relates to devices, systems and methods for run-time reassignment of the interconnection between devices pertaining to a Physical (PHY) layer and devices pertaining to a Media Access Control (MAC) layer, more particularly, to devices and methods enabling reassignment of an interconnection between a PHY device and a first MAC device to a second MAC device with no packet loss or with at most one packet lost.

BACKGROUND

During the past years, the evolution of networking has been driven by intertwining the need of increased capacity with the need of flexibility and fault tolerance. In spite of ongoing standardization efforts, the variation of the communication requirements for the commercially available devices has continuously increased. Therefore, network routers and switches require a large number of physical network interfaces in order to be able to interconnect various network devices within the same network or to intermediate connection with other networks. Network-based applications frequently use communication sessions via physical network interfaces extensively.

The Open System Interconnection (OSI) model is a coherent work-frame for network communication developed by the International Organization for Standardization (ISO). In the OSI model, a communication system is divided in a hierarchy of (seven) layers, each layer being a collection of conceptually similar functions that provide services to the layer above and receives services from the layer below. In other words, an instance of an intermediate layer provides services to instances of layers above and requests services from instances of layers below. The seven layers of the OSI are illustrated in FIG. 1: The Physical layer 10, the Data Link layer 20, the Network layer 30, the Transport layer 40, the Session layer 50, the Presentation layer 60 and the Application layer 70.

Thus, the Physical layer 10 and the Data Link layer 20 are the lowest layers in this OSI model. The Physical layer 10 defines electrical and physical specifications for network devices, performing functions for establishment and termination of a connection to a communication medium, modulation or conversion between the representation of data in user equipment and the corresponding signals transmitted over a communications channel, etc. The Data Link layer 20 provides the functional and procedural means to transfer data between network entities and to detect and possibly correct errors that may occur in the Physical layer 10.

Commercially available devices are configured to provide Physical layer functions (i.e., PHY devices) or Data Link functions (i.e., MAC devices). These devices may communicate based on standard interface specifications, at relatively small distances (e.g., between 7-50 cm) based on copper technologies. Thus, the devices may be physically separated (allowing more flexibility in system and board designs) and interconnected through a crossbar device. The use of a reconfigurable crossbar device enables dynamically reassigning the links between any PHY and MAC devices.

Dynamically reassigning the links between PHY and MAC devices via a reconfigurable crossbar renders the system fault tolerant. However, when this reassignment is performed according to traditional methods, a large number of packets are lost. It is desirable to avoid or even to eliminate the loss of packets particularly during hardware and software upgrades or while an advanced energy management function is executed.

Accordingly, it would be desirable to provide devices, systems and methods that perform dynamic (run-time) reassignment of PHY and MAC devices interconnect with minimal or no packet loss.

SUMMARY

Embodiments for switching a physical (PHY) device of a system linked via a communication media to a remote system, from being connected to a first processing (MAC) device to being connected to a second processing (MAC) device without losing packets communicated between the system and the remote system or at most losing one packet are provided.

According to an exemplary embodiment a method for switching a physical (PHY) device of a system linked via a communication media to a remote system, from being connected to a first processing (MAC) device to being connected to a second processing (MAC) device includes receiving an indication of an upcoming change of connection by the first MAC device and the second MAC device. The method then includes after the receiving of the indication, buffering egress traffic in the second MAC device, and transmitting egress traffic buffered in the first MAC device prior to the receiving of the indication, via the PHY device and the communication media to the remote system. The method further includes interrupting transmission from the first MAC device to the first PHY device, while continuing reception of ingress traffic or of an empty-traffic indication by the first MAC device from the remote system via the PHY device. The method also includes upon receiving a no-remote-traffic indication from the remote system, interrupting, in the first MAC device, reception of ingress traffic or indications from the remote system via the PHY device. The method further includes providing a physical connection between the second MAC device and the PHY device and transmitting and receiving, in the second MAC device, no-remote-traffic indications towards and from the remote system via the PHY device, after the physical connection is provided. The method then includes validating a connection between the second MAC device and the PHY device, by transmitting and receiving empty-traffic indications towards and from the remote system via the PHY device, for at least a predetermined time interval. Finally the method includes transmitting the buffered egress traffic from the second MAC device via the PHY device and the communication media, to the remote system after the validating.

According to another exemplary embodiment, a system connected to a remote system via a communication media includes a physical (PHY) device, a first MAC device, a second MAC device and a controller. The PHY device is connected to the communication media and is configured (1) to forward egress traffic and indications received from a first MAC device or from a second MAC device, towards the remote system, via the communication media, and (2) to forward ingress traffic and indications received from the remote system, via the communication media, towards the first MAC device or the second MAC device. The first MAC device is initially connected to the PHY device and is configured to buffer and forward egress traffic and indications to be transmitted to the remote system, via the PHY device, and to receive ingress traffic and indications from the remote system via the PHY device. The controller is connected at least temporarily to the first MAC device and to the second MAC device, and configured to control the first MAC device and the second MAC device while the system switches from having the PHY device connected to the first MAC device, to having the PHY device connected to the second MAC device. The controller sends an indication of an upcoming change of connection to the first MAC device and the second MAC device, and redirects egress traffic of the system from the first MAC device to the second MAC device after sending the indication. The controller controls the first MAC device (a) to transmit egress traffic buffered in the first MAC device prior to receiving the indication of the upcoming change of connection, via the PHY device and the communication media, to the remote system, after the receiving of the indication, (b) to stop transmitting any traffic or indications towards the first PHY device, while continuing to receive ingress traffic or empty-traffic indications from the remote system via the PHY device and the communication media, until a no-remote-traffic indication is received from the remote system, and (3) to interrupt a connection with the PHY device upon receiving the no-remote-traffic indication from the remote system via the PHY device and the communication media. The controller also controls the second MAC device (a) to buffer the egress traffic therein, after receiving the indication of the upcoming change of connection, (b) to transmit no-remote-traffic indications until receiving a no-remote-traffic indication from the remote system, (c) to validate communication with the remote system via the PHY device by transmitting and receiving empty-traffic indications for at least a predetermined time interval, after receiving the no-remote-traffic indication from the remote system via the PHY device, and (d) to transmit the buffered traffic via the PHY device and the communication media to the remote system, after the communication has been validated.

According to another exemplary embodiment, a MAC device useable in a system communicating with a remote system has a processor and a plurality of communication ports configured to enable communication with the PHY device. The processor is configured to (1) to receive an indication of an upcoming change of connection related to an existing connection with a PHY device of the system, (2) to transmit egress traffic buffered prior to receiving the indication of the upcoming change, via the PHY device to the remote system, (3) to interrupt transmission towards the first PHY device, while continuing reception of ingress traffic or of an empty-traffic indication after finishing transmitting the egress traffic buffered prior to receiving the indication of the upcoming change, (4) to interrupt reception from the PHY device upon receiving an indication that the remote system no longer receives any traffic or indications after interrupting the transmission, (5) to buffer egress traffic received after receiving an indication of an upcoming new connection with a PHY device, (6) to transmit indications that no traffic or indications are received after receiving the indication of the upcoming new connection with a PHY device and no traffic or indications has been received, and (7) to transmit empty-traffic indications for a predetermined time interval before starting to transmit the buffered traffic towards the remote system, after receiving traffic or indications following receiving the indication of the upcoming new connection with a PHY device.

According to another exemplary embodiment, a method for switching a physical (PHY) device of a system linked via a communication media to a remote system, from being connected to a first processing (MAC) device to being connected to a second processing (MAC) device is provided. The method includes receiving an indication of an upcoming change of connection by the first MAC device and the second MAC device, and after the receiving of the indication, buffering egress traffic in the second MAC device. Further, the method includes transmitting egress traffic buffered in the first MAC device prior to the receiving of the indication, via the PHY device and the communication media, to the remote system. The method then includes sending a pause message requesting no ingress traffic to be sent from the remote system for a first predetermined amount of time, from the first MAC device, to the remote system via the first PHY device, while continuing to receive ingress traffic or of empty-traffic indications by the first MAC device from the remote system via the PHY device. The method also includes transmitting empty-traffic indications for a second predetermined amount of time after sending the pause message, from the first MAC device, towards the remote system via the first PHY device, while the remote system finishes sending an in-flight packet and then starts sending empty-traffic indications for the first predetermined amount of time towards the system, via the communication media and the PHY device. The method then includes after the second predetermined amount of time, interrupting a transmission line from the first MAC device to the PHY device and connecting a transmission line of the second MAC device to the PHY device, while a reception line of the first MAC device remains connected to receive empty-traffic or no-remote-traffic indications from the remote system via the PHY device. The method then includes upon receiving a no-remote-traffic indication from the remote system, interrupting, in the first MAC device, a reception line to the PHY device, and connecting a reception line of the second MAC device to the PHY device enabling the second MAC device to receive traffic and indications from the remote system, and upon receiving a no-remote-traffic indication from the remote system, sending empty-traffic indications towards the remote device from the second MAC device, via the PHY device. The method also includes validating a connection between the second MAC device and the PHY device, by transmitting and receiving empty-traffic indications towards and from the remote system via the PHY device, for at least a third predetermined time interval. Finally the method includes transmitting the buffered egress traffic from the second MAC device via the PHY device and the communication media, to the remote system after the validating.

According to another exemplary embodiment, a system connected to a remote system via a communication media includes a physical (PHY) device, a first processing (MAC) device, a second processing (MAC) device, a switch and a controller. The PHY device is connected to the communication media and is configured (1) to forward egress traffic and indications received from a first MAC device or from a second MAC device, towards the remote system, via the communication media, and (2) to forward ingress traffic and indications received from the remote system, via the communication media, towards the first MAC device or the second MAC device. The first MAC device is initially connected to the PHY device and is configured to buffer and forward egress traffic and indications to be transmitted to the remote system, via the PHY device, and to receive ingress traffic and indications from the remote system via the PHY device. The second MAC device to be connected to the PHY device is configured to buffer and forward egress traffic and indications to be transmitted to the remote system via the PHY device, and to receive ingress traffic and indications from the remote system via the PHY device. The switch is to the PHY device, the first MAC device, and the second MAC device and configured to initially provide a first physical connection between the PHY device and the first MAC device, and then to provide a second physical connection between the PHY device and the second MAC device. The controller is connected at least temporarily to the first MAC device, to the second MAC device, and to the switch, and is configured to control the first MAC device, the second MAC device and the switch while the system switches from having the PHY device connected to the first MAC device, to having the PHY device connected to the second MAC device. The controller sends an indication of an upcoming change of connection to the first MAC device and the second MAC device, and redirects egress traffic of the system from the first MAC device to the second MAC device after sending the indication. The controller controls the first MAC device (a) to transmit egress traffic buffered in the first MAC device prior to receiving the indication of the upcoming change of connection, via the PHY device and the communication media, to the remote system, after receiving the indication, (b) to send a pause message requesting no ingress traffic for a first predetermined amount of time to the remote system, while continuing to receive ingress traffic or empty-traffic indications from the remote system via the PHY device, and (c) to transmit empty-traffic indications for a second predetermined amount of time after sending the pause message towards the remote system via the first PHY device. The controller also controls the second MAC device (a) to buffer the egress traffic therein, after receiving the indication of the upcoming change of connection, (b) to transmit no-remote-traffic indications until receiving a no-remote-traffic indication from the remote system, (c) to validate communication with the remote system via the PHY device by transmitting and receiving empty-traffic indications for at least a predetermined time interval, after receiving the no-remote-traffic indication from the remote system via the PHY device, and (d) to transmit the buffered traffic via the PHY device and the communication media to the remote system, after the communication has been validated. Finally, the controller controls the switch (a) to interrupt a transmission line between the first MAC device and the PHY device and to connect a new transmission line between the second MAC device and the PHY device after the second predetermined has elapsed, and (b) to interrupt a reception line between the first MAC device and the PHY device and to connect a new reception line between the second MAC device and the PHY device when a no-remote-traffic indication is received from the remote system.

According to another exemplary embodiment, a MAC device useable in a system communicating with a remote system has a processor and a plurality of communication ports configured to enable communication with the PHY device. The processor is configured (1) to receive an indication of an upcoming change of connection related to an existing connection of the MAC device with a PHY device of the system, (2) to transmit egress traffic buffered prior to receiving the indication of the upcoming change, via the PHY device to the remote system, (3) to send a pause message requesting no ingress traffic to be sent from the remote system for a first predetermined amount of time while continuing to receive ingress traffic or of empty-traffic indications from the remote system via the PHY device, (4) to transmit empty-traffic indications for a second predetermined amount of time after sending the pause message, towards the remote system via the first PHY device, (5) to interrupt transmission towards the first PHY device, while continuing reception of ingress traffic or of an empty-traffic indication after the second predetermined amount of time, (6) to interrupt reception from the PHY device upon receiving no-remote-traffic indication from the remote system, (7) to buffer egress traffic received after receiving an indication of an upcoming new connection with a PHY device, (8) to transmit no-remote-traffic indications after receiving the indication of the upcoming new connection with a PHY device and until traffic or indications are received, and (9) after receiving traffic or indications from the remote system via the PHY device following the indication of the upcoming new connection with the PHY device, to validate the new connection by transmitting empty-traffic indications for a third predetermined time interval, before starting to transmit the buffered traffic towards the remote system.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 2 illustrates sub-layers of the Physical (PHY) layer and the Data Link layer and interfaces there-between;

DETAILED DESCRIPTION

Figure 1:
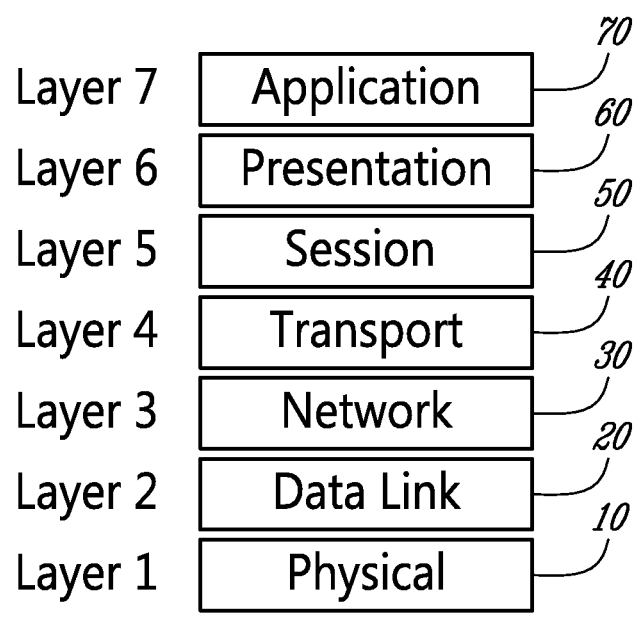
FIG. 1 is a diagram of layers in the OSI model.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a network communication system. However, the embodiments to be discussed next are not limited to these systems, but may be applied to other existing systems that transfer packets of data among devices.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

Unlike the conventional static interconnection between PHY and MAC devices, reconfigurable crossbars allow reconfiguration of connections among plural devices of corresponding types. The dynamically reconfigurable crossbar transparently interconnects the respective devices.

According to one aspect of the inventive concept included in some embodiments, remapping a link between a PHY device and a MAC device is controlled by system management functions. Such management functions are used to control a centralized crossbar device for enforcing remapping of the connections between different devices, and for controlling the input/output (I/O) and forwarding blades where the PHY and Mac devices are located respectively, in order to prepare a run-time reconfiguration of the association between a PHY device and a MAC device.

According to another aspect of the inventive concept included in some embodiments, different methods perform the reassignment with minimal or no loss of packets using different reassignment strategies depending on the capabilities of the monitoring functions in the PHY and MAC devices of the local and remote systems. Some embodiments use a "Remote Fault" message and at most one packet may be lost. Other embodiments used the "Pause" message and packet loss is avoided. The methods are based on a controlled sequence of standard-based events and messages.

Overview of PHY to MAC Interconnections

Standardized interfaces may be used between different layers and sub-layers of the OSI model to interconnect physically separated PHY and MAC devices. Such a decoupling allows the devices (PHY and MAC) to be selected independently from each other, and possibly from different vendors, as long as the protocol interconnecting them is supported by both devices. A protocol used to exchange information between a PHY and a MAC device is named a chip-to-chip electrical interface specification. The choice of protocol and interface affects the complexity required by the physical layer functions. The communication protocols are usually used for relatively small distances (e.g. up to 50 centimeters), are based on copper technologies, and may require specific re-clocking and/or re-coding functions when connection is established. The fact that PHY and MAC devices can be separated allows for more flexibility in the network system and board designs.

Ethernet standards specify a number of wiring and signaling standards for the Physical Layer, a common addressing format and a variety of Medium Access Control procedures at the lower part of the Data Link layer. Depending on the Ethernet standard applied and on the number and speed of the links available between the PHY and MAC devices, three main different types of physical interfaces may be used: a Medium Independent Interface (MII), an Attachment Unit Interface (AUI) and a Parallel Physical Interface (PPI).

Thus, the commercially available PHY and MAC devices (as physically separated devices) are capable of communicating based on various instances of these main types. For example, the following MII type of interfaces may be used: a Serial MII (SMII), a reduced MII (RMII), a Gigabit MII (GMII), a reduced GMII (RGMII), a Quad Serial Gigabit MII (QSGMII), a 10 Gigabit MII (XGMII), etc. Alternatively, the following AUI type of interfaces could also be used: a 10-Gbps AUI (XAUI), a 40-Gbps AUI (XLAUI), a 100-Gbps AUI (CAUI), etc. Again alternatively, the following PPI type of interfaces could also be used: a 40-Gbps PPI (XLPPI), a 100-Gbps PPI (CPPI), etc.

Figure 2:
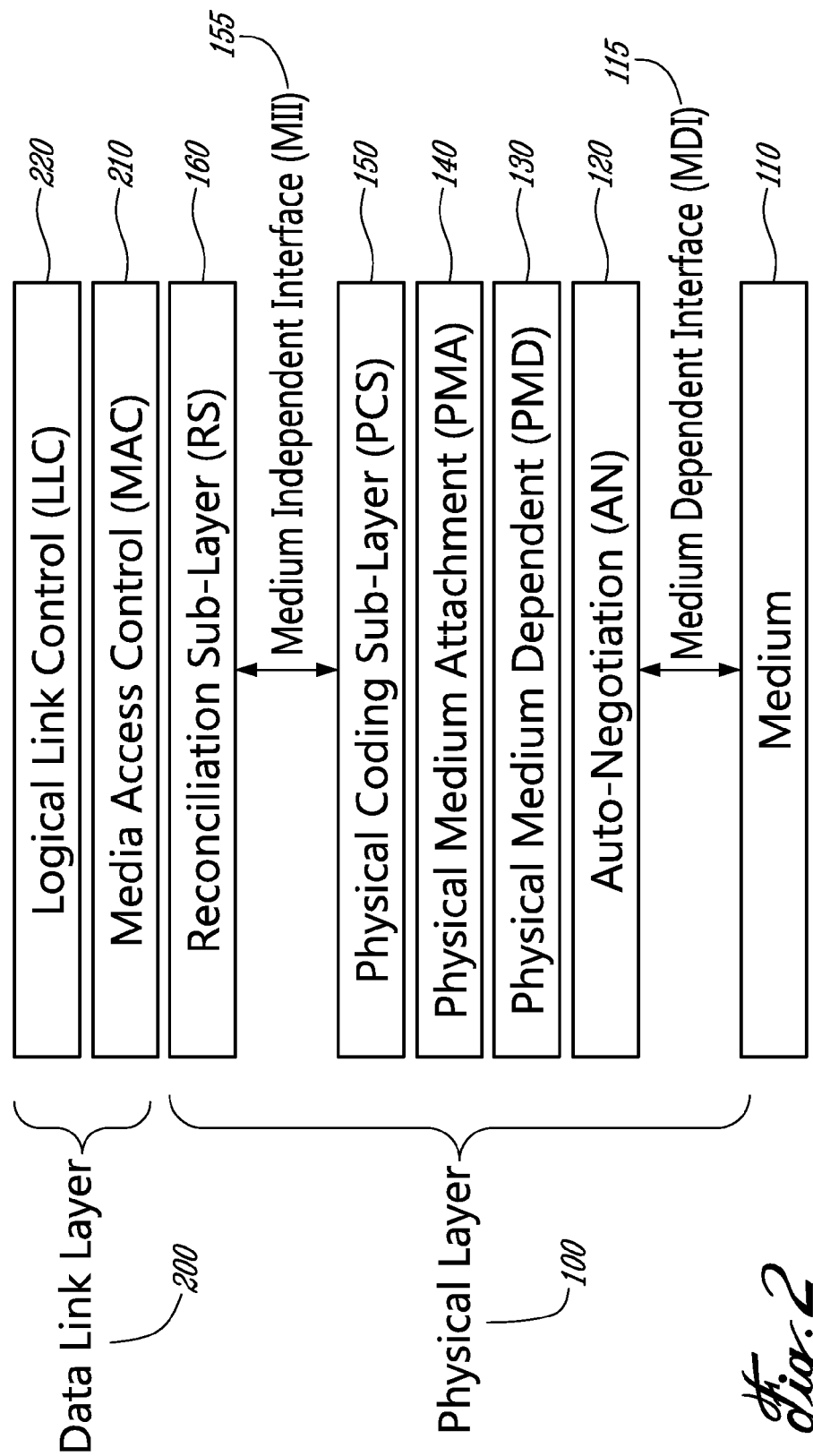

The IEEE 10-Gbps Ethernet standard specification divides the OSI model layers into sub-layers. FIG. 2 illustrates the sub-layers of the Physical (PHY) layer 100 and the Data Link layer 200. For a communication medium 110 (e.g., a group of copper wires), the PHY layer 100 includes an auto-negotiation sub-layer (AN) 120, a physical medium dependent (PMD) 130, a physical medium attachment (PMA) 140, a physical coding sub-layer (PCS) 150 and a Reconciliation Sub-layer (RS) 150, listed here from bottom up. A sub-layer instance services to instances of sub-layers above and requests services from instances of sub-layers below. Some of the sub-layers illustrated in FIG. 2 are optional, depending on the type of medium. The Data Link layer 200 includes the Media Access Control (MAC) 210 on top of the RS 160 (which is part of the PHY layer 100), and then a Logical Link Control (LLC) 220 on top of MAC 210.

Based on this hierarchical structure, a PHY device may provide the functions of the AN 120, the PMD 130, the PMA 140, and the PCS 150, being connected to the medium via a Medium Dependent Interface (MDI) 115, and a MAC device may provide the functions of the RS 160, the MAC 210 and the LLC 220, being connected to the PHY device via a Medium Independent Interface (MII) 155. In this context, one has to keep in mind that OSI model and the standards are merely theoretical concepts, and a PHY device does not automatically mean a device performing all the PHY layer functions, and a MAC device does not automatically mean a device performing all and only the Data Link layer functions, respectively.

The PCS 150 is coupled to RS 160, which provides a signal mapping between the medium independent interface (MII) and the MAC sub-layer 210. The PCS 150 encodes and decodes the data that is transmitted and received (for making it easier for the receiver to recover the signal). In general, the PMA 140 shields the PCS 150 from the physical medium 110 (i.e., the PCS 150 operate independent of the type of medium being used). The PMD 130 is responsible for generating electrical or optical signals depending on the nature of the (physical) medium 110.

The MAC sub-layer 210 is a sub-layer of the Data Link layer 200 that provides addressing and channel access control mechanisms making it possible for several terminals or network nodes to communicate using a multi-point network. The MAC sub-layer 210 acts as an interface between the LLC sub-layer 220 and the network's PHY layer 100. The MAC layer 210 emulates a full-duplex logical communication channel in a multi-point network.

Figure 3:
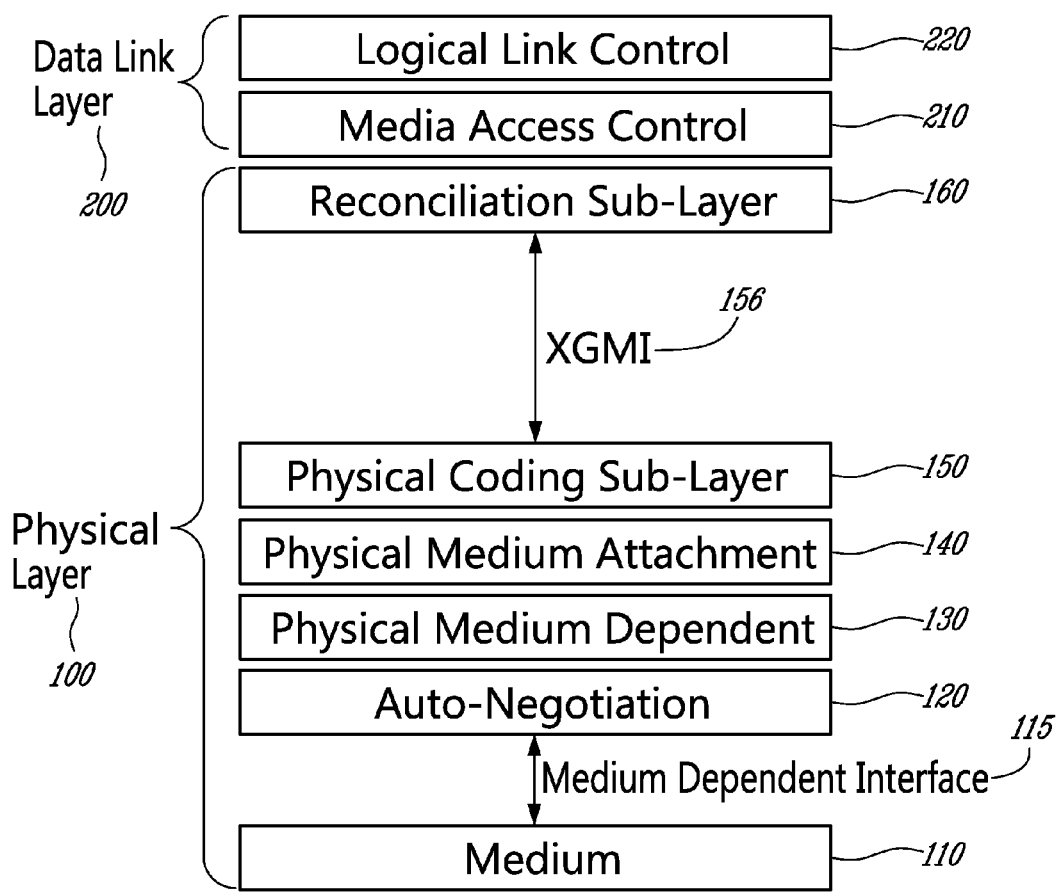
FIG. 3 illustrates an XGMII-based decoupling of PHY and MAC devices for 10G Ethernet.
Figure 4:
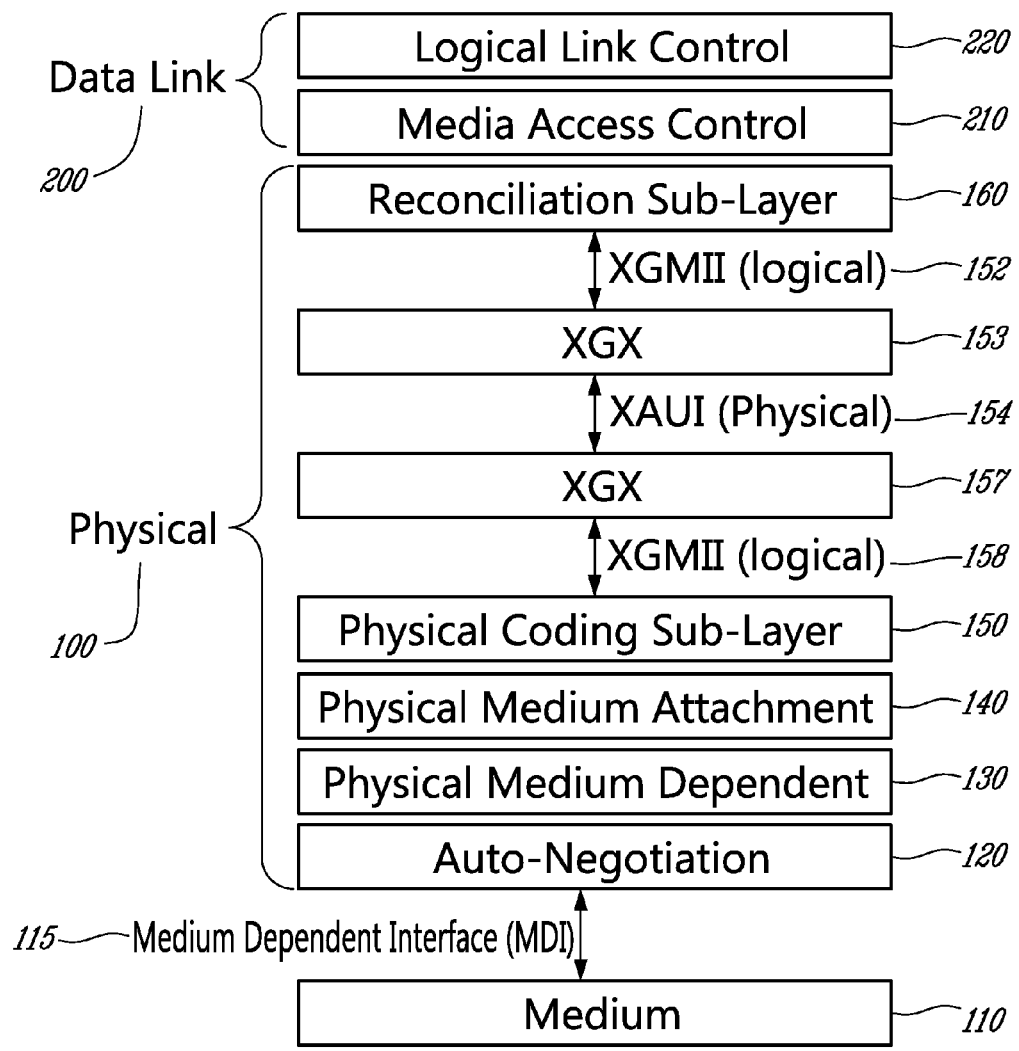
FIG. 4 illustrates an XAUI-based decoupling of PHY and MAC devices for 10G Ethernet.

The interface 155 between the PCS 150 and the RS 160 can be based on two possible types of interfaces: a Media Independent Interface (MII), or an Attachment Unit Interface (AUI). In the case of a 10G Ethernet standard, a possible MII type of interface could be the XGMII 156, as illustrated in FIG. 3. Alternatively, also in the case of 10G Ethernet standard, a possible AUI type of interface could be the XAUI 154, as illustrated in FIG. 4. When the XAUI 154 is used to decouple a PHY and a MAC device as a physical interface, the XGMII 152 and 158 become a logical interface. The XAUI 154, which is also located between the PCS 150 and RS 160, is mainly used to tunnel the XGMII protocol over longer distances using only four links at 3.125 Gbps.

Besides the physical interfaces XGMII 152 and 158 and the logical interface XAUI 157, an XFI (10 Gbps Ethernet Framer Interface) may be included in the PHY device, this interface being located between the PMD 130 and the PMA 140, whereby the XFI connected device (e.g. XFP—10 Gbps Ethernet Form Factor Pluggable) hosts a clock recovery circuit in the PHY device.

The characteristics of the interfaces used between a PHY and a MAC device depend on the speed of the Ethernet standard. While the 10G Ethernet would typically use either an XGMII or a XAUI to interconnect a PHY and a MAC device, the 40G Ethernet would typically use an XLAUI or a XLPPI to interconnect the devices. Although an XLGMII is theoretically possible, this type of interface is considered a logical interface rather than a physical interface in the 40G Ethernet standard, because too many pins would be necessary to interconnect a PHY device with a MAC device using this interface.

Figure 5:
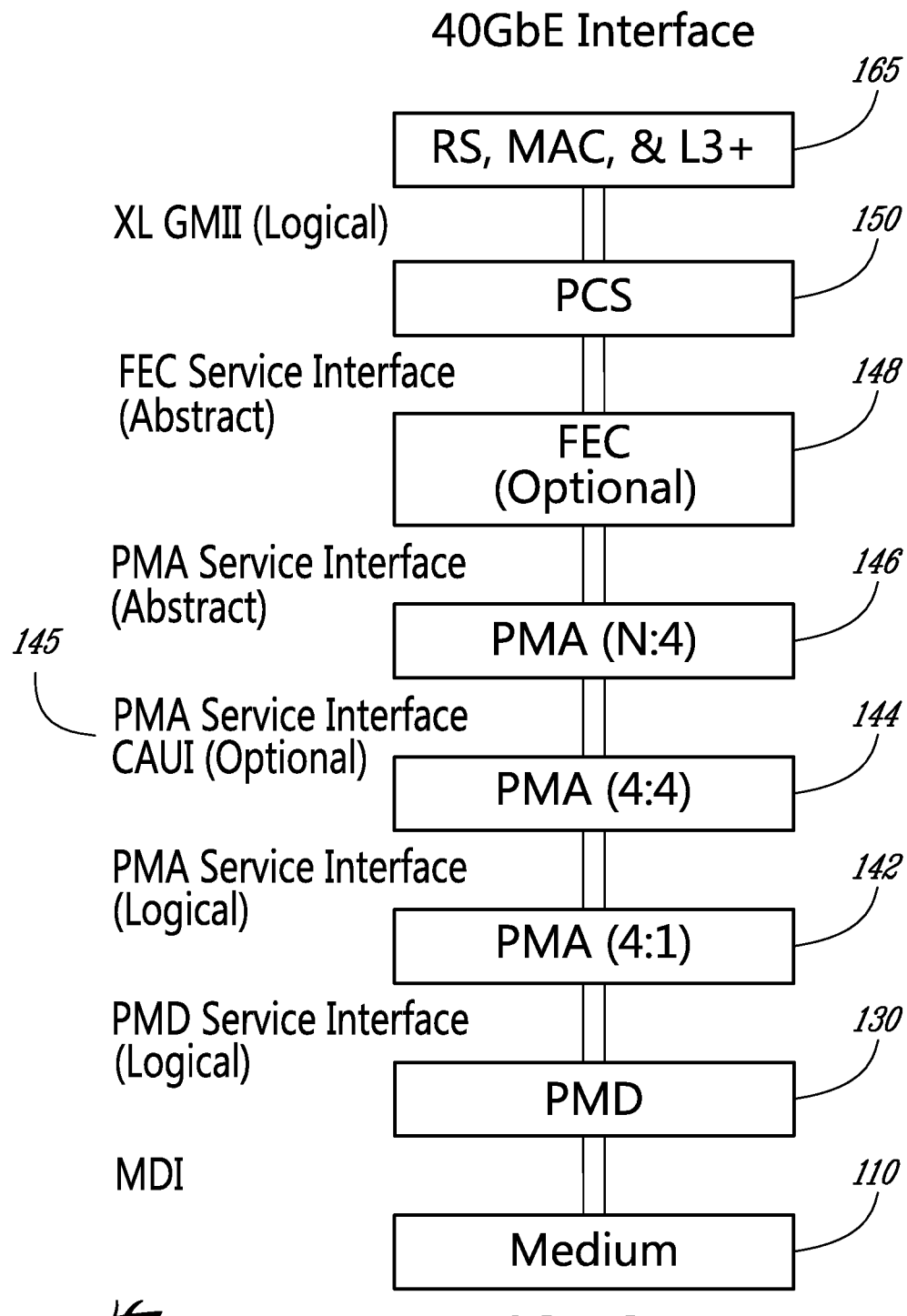
FIG. 5 illustrates an XLAUI-based decoupling of PHY and MAC devices for 40G Ethernet.

FIG. 5 illustrates an XLAUI 145 used within the PMA in order to interface the PMD 130 and the PCS 150. Alternatively, an XLPPI may also be used to interface a PHY and a MAC device for a 40G Ethernet connection. The interface located between the PMD and the PMA sub-layers is based on the XFI specified for the 10G Ethernet standard. By using a specific mechanism, multiple XFI lanes (i.e. four) can be used to provide the 40G Ethernet bandwidth required.

Further, within the same context in which characteristics of the interfaces used between a PHY and a MAC device depend on the speed of the Ethernet standard, a CAUI or a CCPI can be used to interconnect the physical and the MAC device for the 1000 Ethernet. Although a CGMII is theoretically possible, this type of interface is considered a logical interface rather than a physical interface in the 1000 Ethernet standard, because too many pins would be necessary to interconnect a PHY device with a MAC device using this interface.

Figure 6:
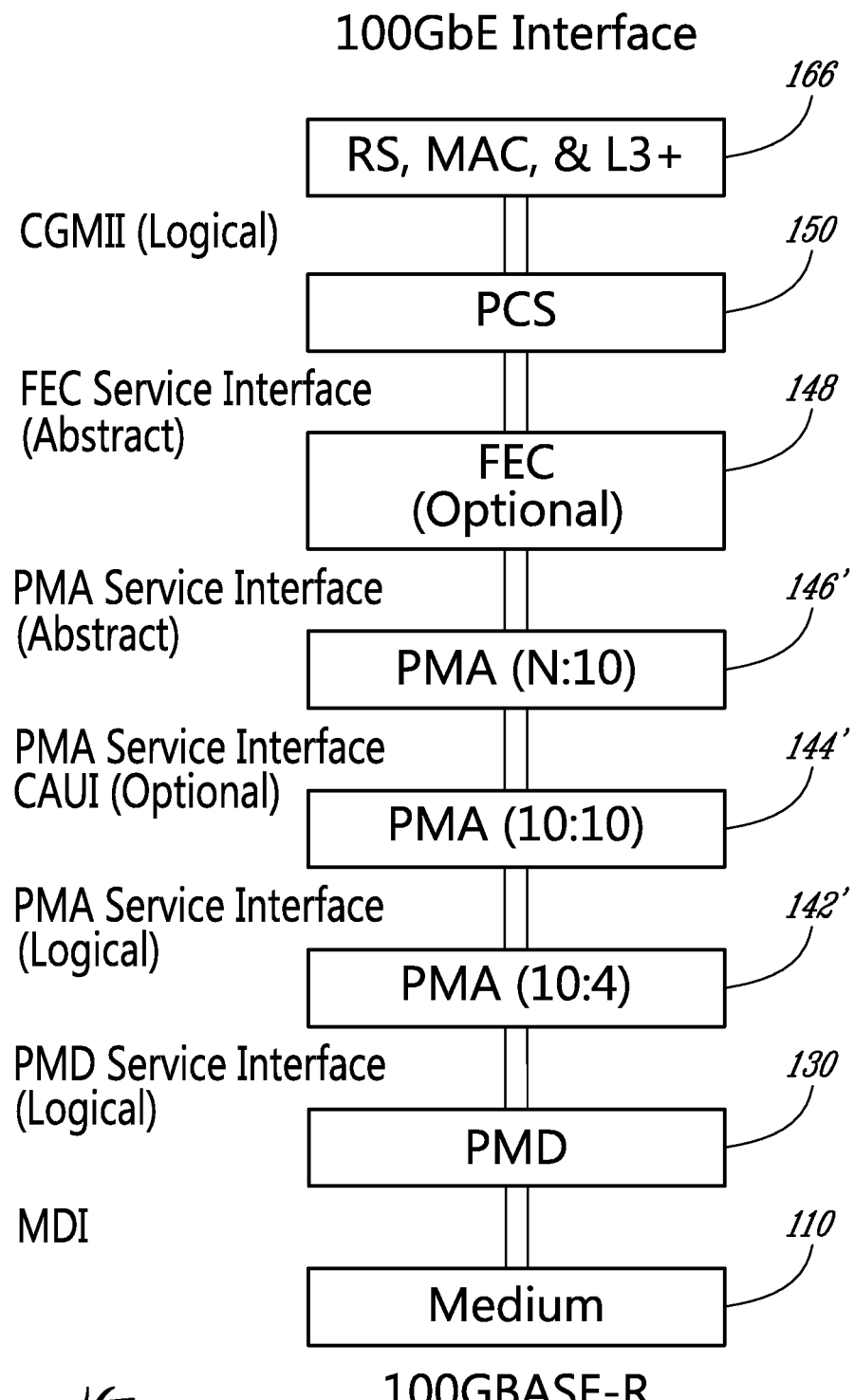
FIG. 6 illustrates a CAUI-based decoupling of PHY and MAC devices for 1000 Ethernet.

FIG. 6 illustrates a CAUI 145' used within the PMA in order to interface the PMD 130 and the PCS 150. Alternatively, an CPPI may also be used to interface a PHY and a MAC device for a 100G Ethernet connection. The interface located between the PMD and the PMA sub-layers is based on the XFI specified for the 10G Ethernet standard. By using a specific mechanism, multiple XFI lanes (i.e., ten) can be used to provide the 40G Ethernet bandwidth required. As an alternative, four lanes can also be used assuming that the lanes are rather based on CEI, which can reach speed of 28 Gbps per lane. Current versions of 10G Ethernet Standard, 40G Ethernet Standard, and 1000 Ethernet Standard are included herewith by reference in their entirety.

When building a communication system, a network of PHY and MAC devices in which any PHY devices to be interconnected to any MAC devices can be used in order to take advantage of the maximum flexibility offered by the decoupling between a PHY and a MAC device. As discussed above, the PHY and MAC devices can be interconnected directly using standard interfaces, such as XFI, CEI, XGMII, XAUI, XLAUI, CAUI, etc. An electrical crossbar or an optical crossbar may be used to redirect the signals between any two devices of the network of PHY and MAC devices. The crossbars provide a highly transparent manner of connecting the devices from the perspective of signal processing. While electrical crossbar devices are currently commercially available, optical crossbar devices under development.

Figure 7:
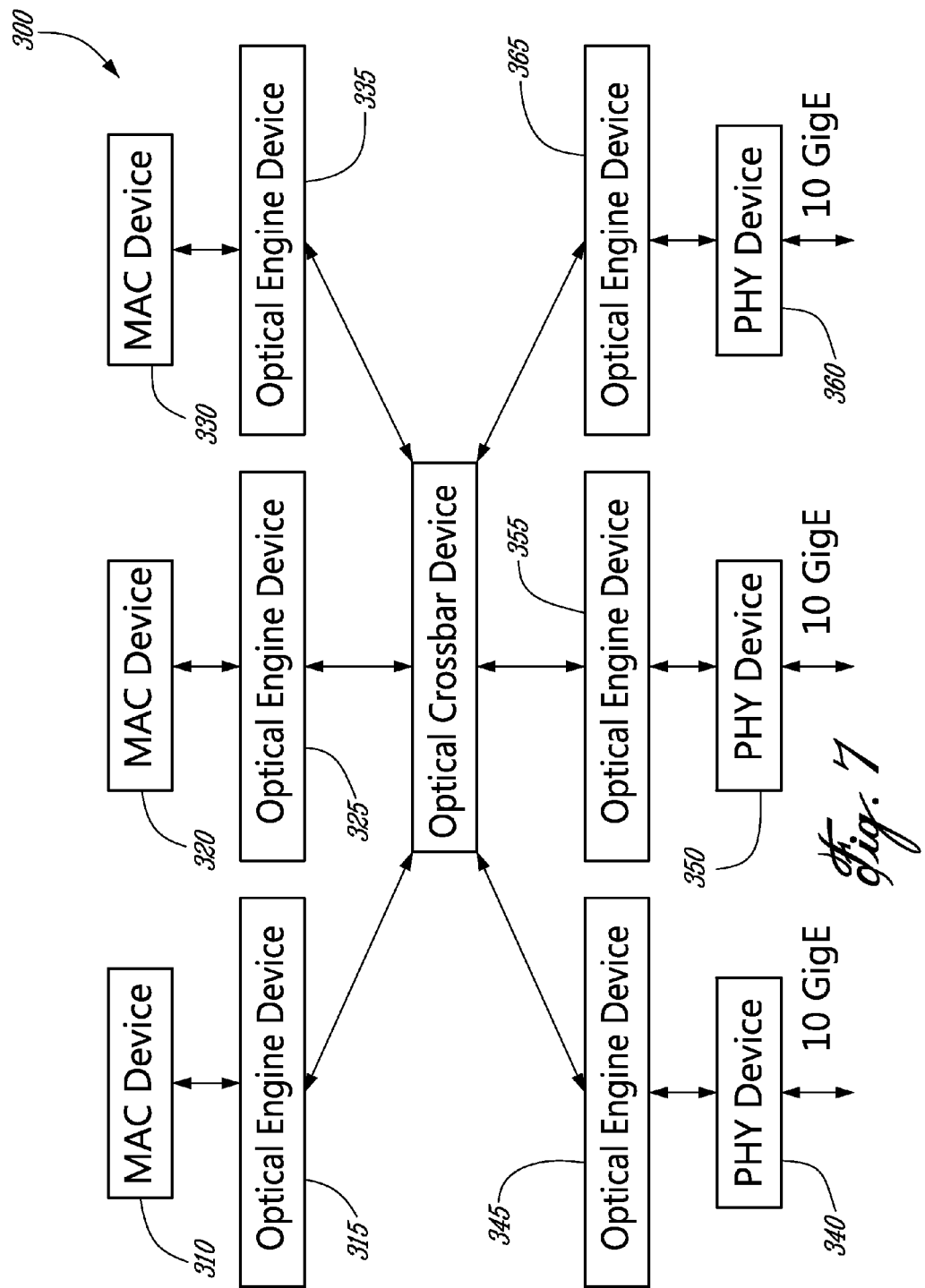
FIG. 7 is a schematic diagram of a system according to an exemplary embodiment.

FIG. 7 illustrates a system 300 including a network of MAC devices 310, 320, 330 and of PHY devices 340, 350, 360 interconnected via an optical crossbar 400, according to an exemplary embodiment. Each of the MAC devices 310, 320, 330, and each of the PHY devices 340, 350, 360 are connected to the crossbar 370 via an optical engine device 315, 325, 335, 345, 355, and 365, respectively. The optical engine devices 315, 325, 335, 345, 355, 365 are configured to convert electric signals communicated from and to the one of the PHY or MAC devices linked thereof, into and from optical signals. Using optical signals has advantages related to energy saving, an increased bandwidth capacity, an increased distance, etc.

The network of PHY and MAC devices may use one of the standardized interfacing protocols described above or other protocols configured to decouple physically a PHY and a MAC device. The protocol used to decouple PHY and MAC devices may be: XFI, CEI, XGMII, XAUI, XLAUI, CAUI, XLPPI, CPPI, etc. Basically, the selected protocol would be carried between the devices, and going through the crossbar device transparently.

The features of the PHY devices are defined based on speed and physical media characteristics. For example, the features of the PHY devices are specified by IEEE in the P802.3ae specification, for the 10 Gbps Ethernet. Depending on the features required for the PHY devices in the system, different protocols might be available for decoupling the different sub-layers, which also means physically separating the PHY device from the MAC device.

Figure 8:
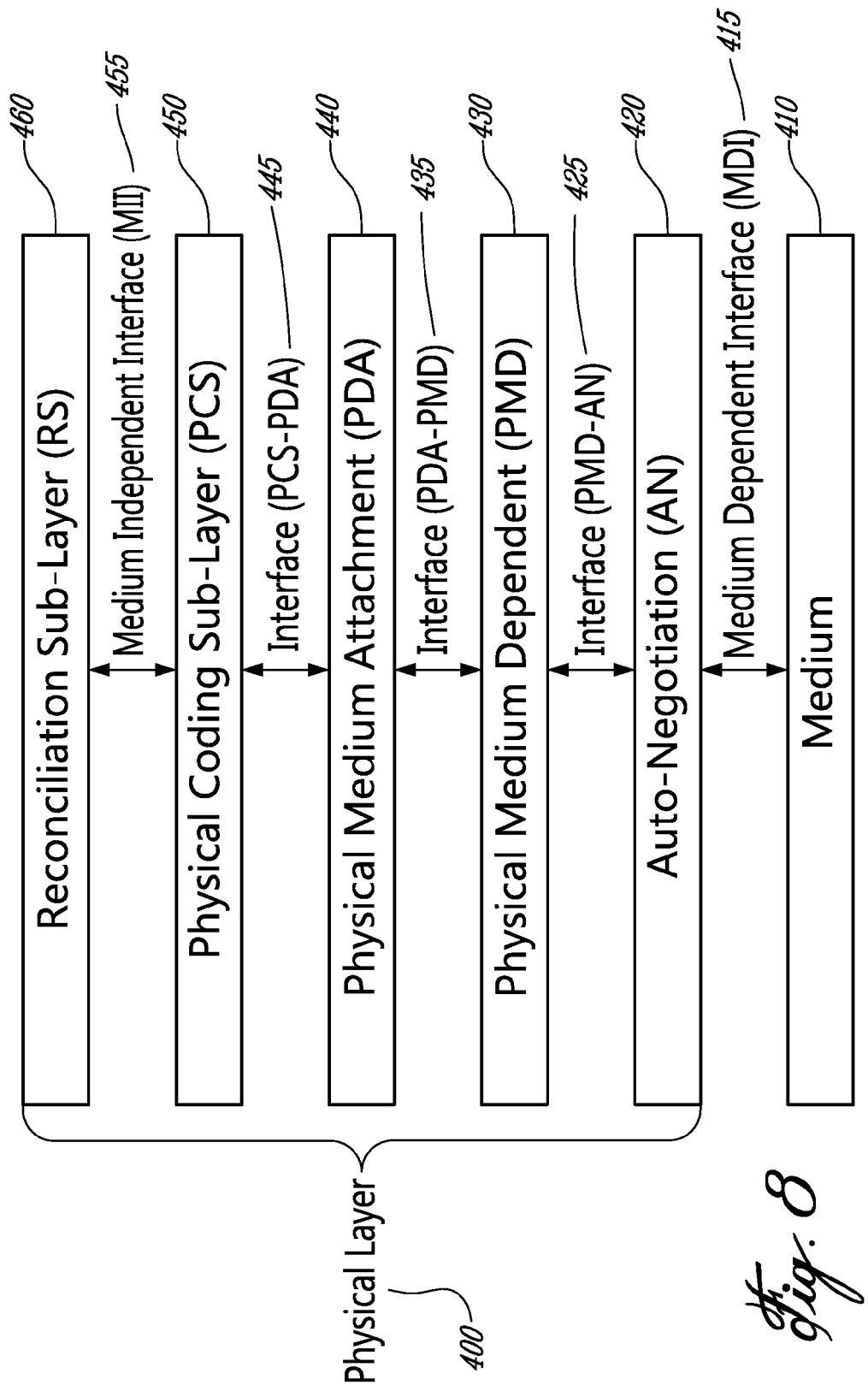
FIG. 8 illustrates sub-layers and interfaces of the physical layer.

The features of the PHY devices may be specified based using the seven OSI model layers, and some specific sub-layers. FIG. 8 illustrates such a multiple layers and sub-layers approach with interfaces there-between specified mainly as an abstraction layer between the physical and the data link layers, as well as between their constituent sub-layers. Thus:
(1) between a medium 410 and an Auto-Negotiation (AN) sub-layer 420 of the PHY layer 400 layer there is a Medium Dependent Interface (MDI) 415,
(2) between the AN sub-layer 420 and a Physical Medium Dependent (PMD) sub-layer 430 of the PHY layer 400 layer there is a PMD-AN interface 425,
(3) between the PMD sub-layer 430 and the Physical Medium Attachment (PMA) sub-layer 440 of the PHY layer 400 layer there is a PDA-PMA interface 435,
(4) between the PMA sub-layer 440 and the Physical Coding Sub-Layer (PCS) 450 of the PHY layer 400 layer there is a PCS-PDA interface 445, and
(5) between the PCS 450 and the Reconciliation Sub-layer (RS) 460 of the PHY layer 400 layer there is a Medium Independent Interface (MII) 455.

Figure 9:
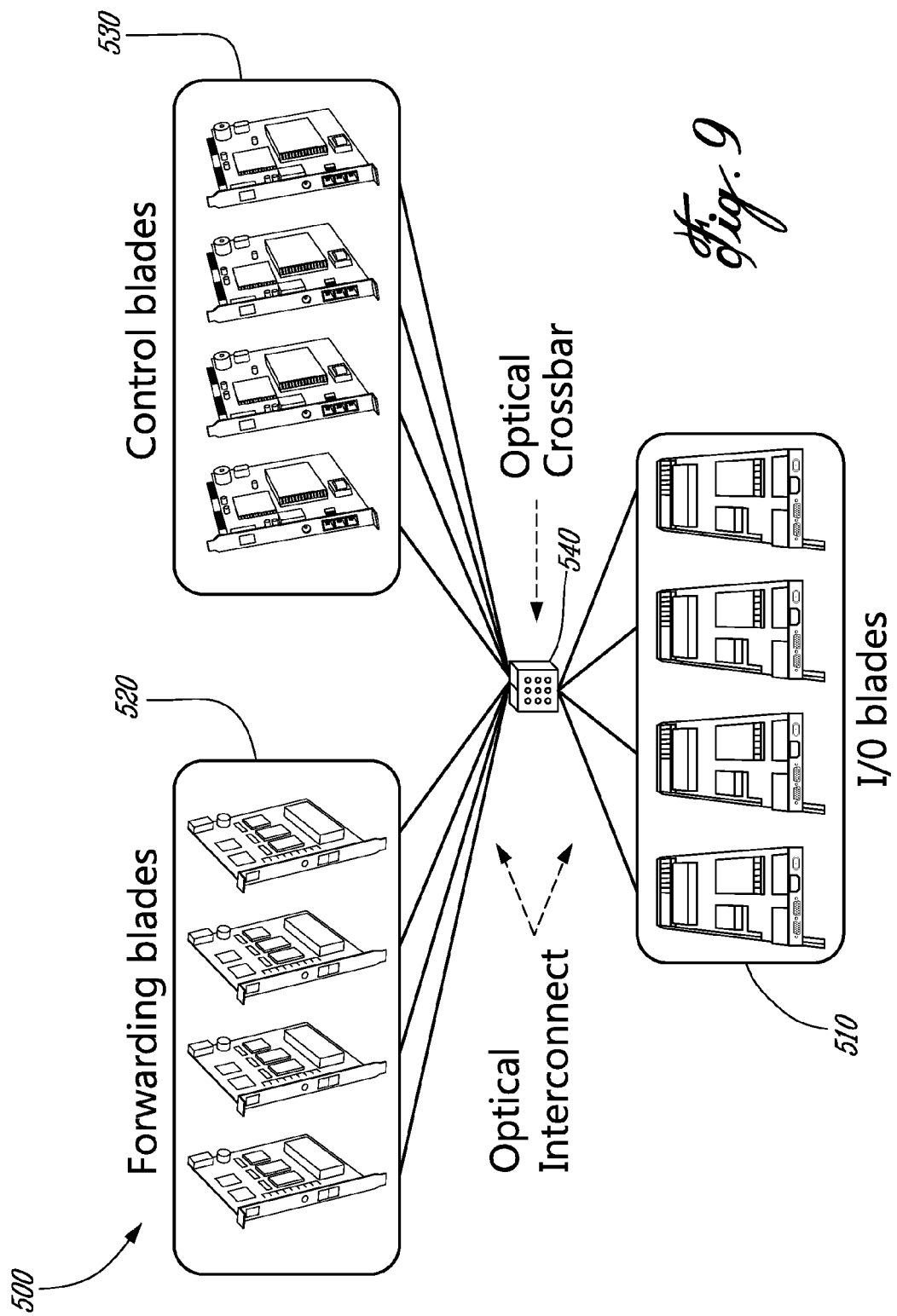
FIG. 9 is a schematic diagram of a system according to another exemplary embodiment.

From the point of view of physical appearance, a system 500 according to an embodiment illustrated in FIG. 9 includes different types of blades: forwarding blades 510, control blades 520 and I/O blades 530. An I/O blade operates to interconnect the system with remote systems physically exchanging electrical or optical signals with the remote systems. The forwarding blades 520 and the control blades 530 provide data processing capacity. A forwarding blade includes a fast specialized processor mainly used for forwarding packets. A control blade includes one or more processors configured to perform the control functions of the system 500. A crossbar device 540 interconnects the I/O blades 510, the forwarding blades 520 and the control blades 530. The PHY devices are likely located on I/O blades, while MAC devices are likely located on forwarding and control blades.

Reassignment of PHY and MAC Devices Interconnections

Unlike in the conventional static interconnection between a PHY device and a MAC device, when a network of PHY devices and MAC devices are interconnected via a device capable to reconfigure the connections, such as a crossbar, a dynamic mapping between any PHY and MAC devices of the network becomes possible.

Without being a frequent operation, a dynamic reassignment of the interconnections between PHY and MAC devices may occur in few circumstances. For example, in order to benefit from the higher Mean Time Between Failures (MTBF) ratio of the cards (on the I/O blades) supporting the PHY devices compared to the cards (on the forward or control blades) supporting the MAC devices, since the cards (boards) with the MAC devices from the cards (boards) with the PHY devices are physically decoupled, it becomes possible to install, uninstall, upgrade or replace a card (board) with a MAC device without having to take out of service the corresponding card (board) with the PHY devices. Given that the physical network interfaces such as, 10 Gbps Ethernet are connected to the PHY devices, maintaining the PHY device operational while the MAC device is replaced by simply redirecting a communication link from a PHY device to another available MAC device than an initially connected MAC device (that has become unavailable, or otherwise is replaced) becomes advantageously possible without having to disconnect and reconnect any cables.

The remapping between a PHY and a MAC device is foreseen to occur mainly for maintenance and upgrade reasons, at a rather low rate. Even though such a remapping/reconfiguration is not likely to be frequent, the speed of performing such an operation may be of essence (i.e., the time it would take the crossbar device to perform the remapping of the connections between a PHY and a MAC device would be important). Additionally, the time it would take the PHY and MAC devices to validate a newly established interconnection should also be taken into account.

According to one aspect of some embodiments, the remapping between a PHY and a MAC device is controlled by system management functions. Such management functions may be used to control a centralized crossbar device, responsible for enforcing the remapping of the connections between the different devices and for controlling the I/O and the forwarding blades, where the PHY and MAC devices are located, respectively, in order to prepare them for a run-time reconfiguration to a new interconnection between a PHY and a MAC device.

Thus, when a logical and physical remapping of the connections between a PHY device and a MAC device occurs, one of the most important challenges remains to perform that remapping on a live system, with minimum impact on traffic—ideally, without packet loss during the reconfiguration operation. Such a dynamic reassignment requires an existing link between a PHY device and a MAC device to be broken before a new link between the PHY device and another MAC device is established. When a link is broken, the communication line is interrupted, and the devices detect a communication failure. The inter layers or sub-layers interfaces may carry signaling information, such as, link status information.

The link status information signals whether a link is operative or has failed. Every sub-layer reports link status information to the associated RS sub-layer. Because the RS sub-layer centralizes the fault detection information, the RS sub-layer controls whether the MAC sub-layer can transmit frames or not. In other words, every link status information message has to reach the RS sub-layer, which can then take appropriate action, such as controlling whether frames can be transmitted or not.

Figure 10:
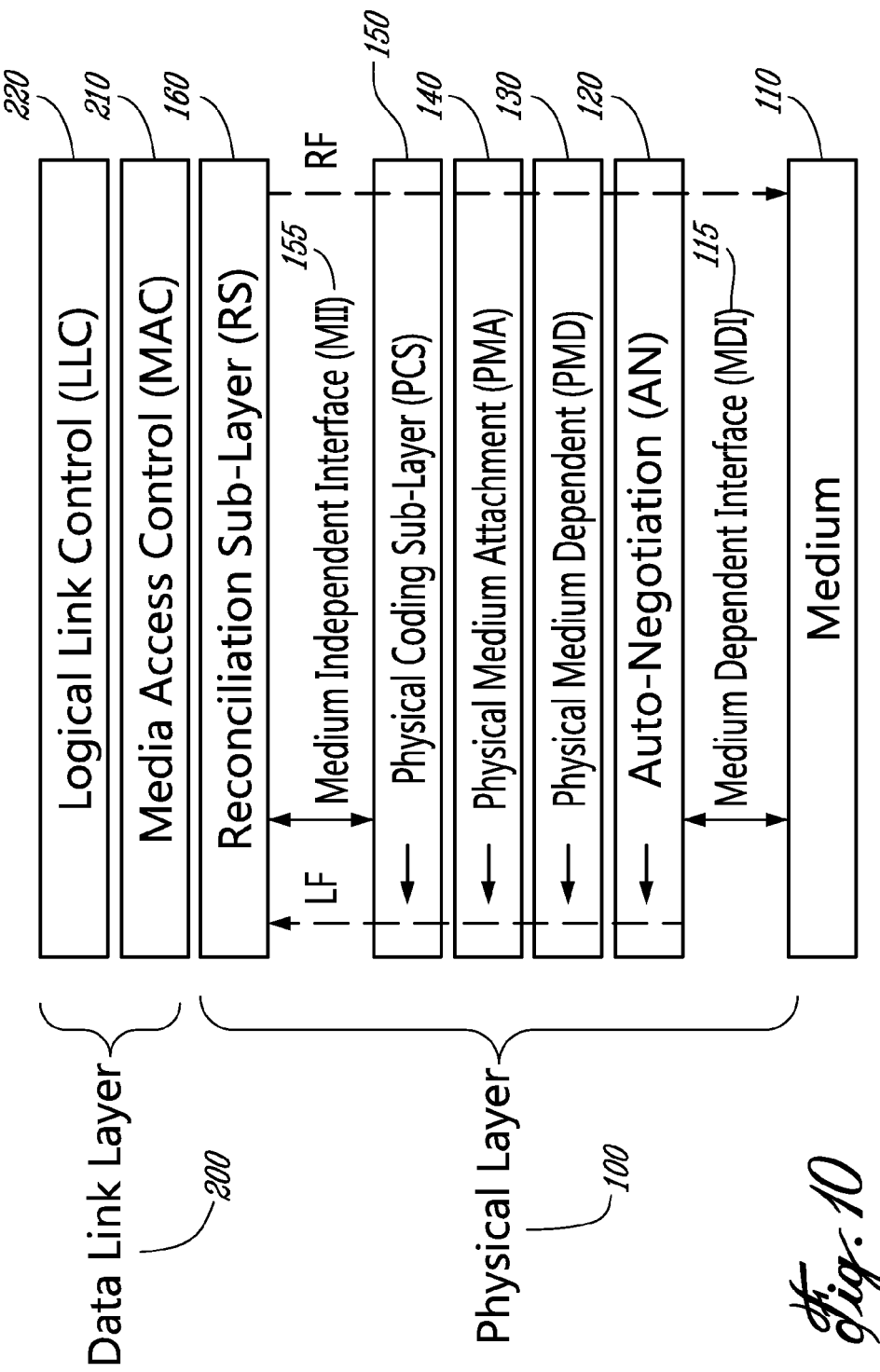
FIG. 10 is a schematic diagram of status information signaling.

The link status information includes predefined (standard) messages. Embodiments described hereinafter are configured to operate using at least one of a Local Fault (LF) message and a Remote Fault (RF) message. FIG. 10 illustrates link status signaling using the LF message and the RF message according to an exemplary embodiment. Any of sub-layers of the physical layer 100 (i.e., AN 120, PMD 130, PMA 140, PCS 150) may report a Local Fault (LF) message to the RS 160. However, only the RS 160 can generate a Remote Fault (RF) message toward a remote end-point connected via the medium 110. In some embodiments, an inter-frame period (i.e., between subsequent packets) is used to transmit link status information to the RS 160, using a control character and a status encoded data sent in a single clock cycle.

In order to determine that a failure has occurred, the RS 160 has to receive multiple LF messages. Upon detecting of a link failure, a sub-layer (i.e., any of AN 120, PMD 130, PMA 140, PCS 150) continuously sends LF messages to the RS 160. When the RS 160 receives no LF messages, the communication operates normally.

Upon receiving multiple LF messages, the RS 160 inhibits the transmission of frames, starts continuously transmitting RF messages towards the remote end-point. Receiving an RF message at the RS 160 indicates that a remote RS (not shown, pertaining to a structure similar to the one in FIG. 10 communicating therewith via the medium) of the remote end-point has detected a fault, and therefore, the RS 160 inhibits the transmission of frames, and starts continuously transmitting an Idle pattern towards the remote end-point.

In the context of the telecommunication business, 99.999% of availability is required for carrier-grade systems, which means a maximum of 5.26 minutes of down-time per year. Therefore, the equipment and solutions are provided in order to minimize or completely avoid down-time. Performing maintenance operations (such as hardware and software upgrades) on carrier-grade systems while avoiding down-time, is challenging.

Thus, the interconnections between PHY and MAC devices (which devices are located on I/O and forwarding blades, respectively, interconnected through a reconfigurable crossbar device) may be remapped with minimum down-time and loss of packets by using the capabilities of the monitoring functions located in the MAC and PHY devices of the local and the remote systems. For example, a smooth remapping of PHY to MAC devices interconnection may be achieved by taking advantage of the link status messages used to report faults on PHY devices on the different systems.

Description of Embodiments Incorporating a First Strategy

In some embodiments, a 'Remote Fault' message is used in a system configured to accommodate the remapping of I/O blades to different Application-Specific Standard Product (ASSP) blades, in the event of a planned remapping, or reconfiguration, of the association between an I/O blade and an ASSP blade. In this scenario, the rerouting of traffic from the I/O blade via a new ASSP blade may result in at most one single packet loss.

Figure 11:
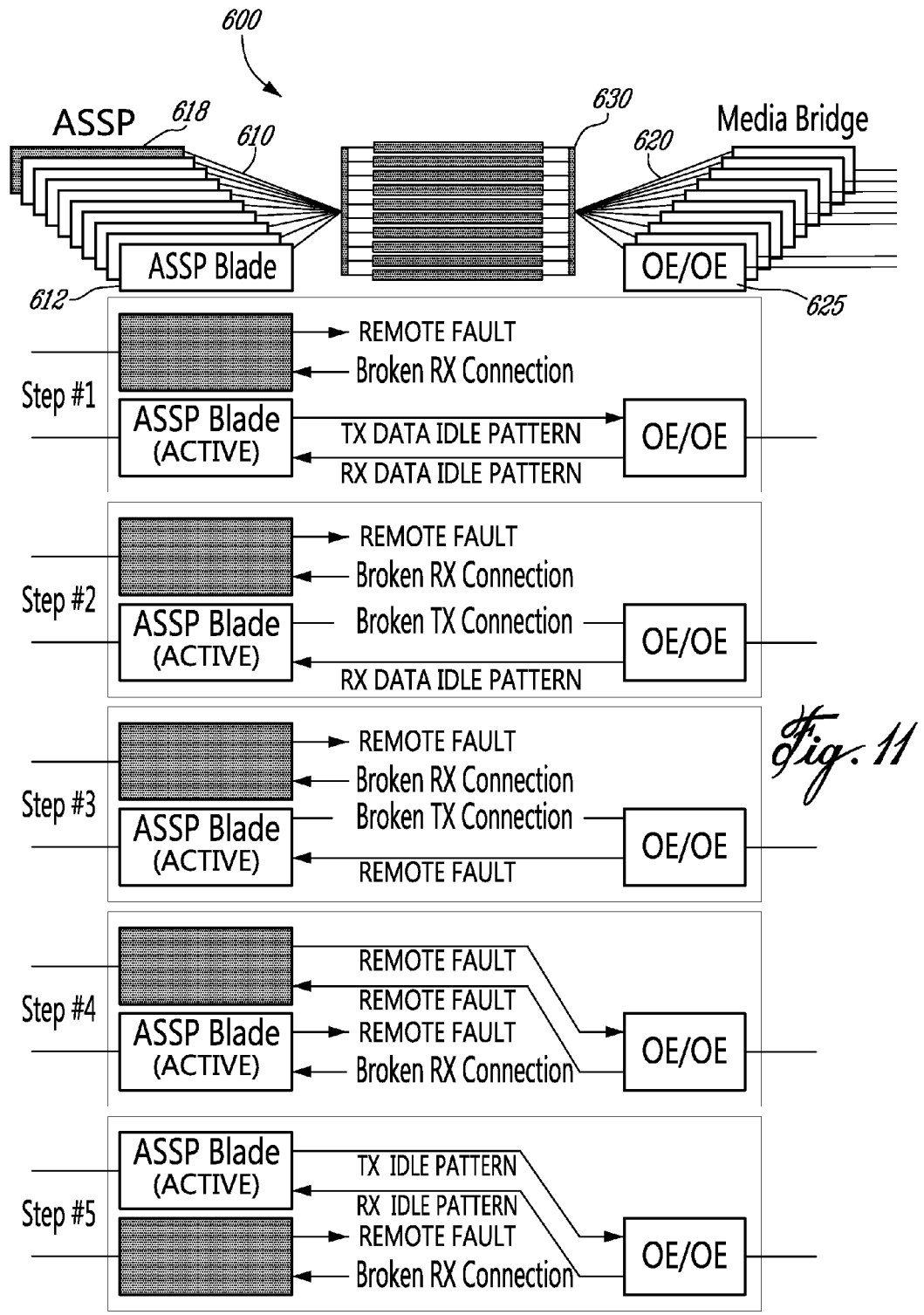
FIG. 11 is a sequence diagram of a first strategy according to an exemplary embodiment.

A logical sequence of events during a run-time reassigning of a connection between a PHY device located on an I/O blade and a MAC device located on a forward or control blade using the RF message is illustrated in FIG. 11. The method according to a first strategy focuses on the events triggered by physically disconnecting a PHY device and a MAC device, while assuming that the crossbar device is timely reconfigured in order to remove the initial link and establish the new link between the respective devices (blades).

A system 600 includes an ASSP block 610 and a media bridge 620. The ASSP block 610 includes a plurality of ASSP blades and the media bridge 620 includes a plurality of I/O blades. A switch 630 is located between the ASSP block 610 and the media bridge 620. The switch 630 is configured to enable switching a connection between one of the I/O blades and one of the ASSP blades with a connection between the one I/O blade and another ASSP blade. However, practically the switch 630 may be a crossbar that enables interconnecting the ASSP blades of the ASSP block 610 with the I/O blades of the Media Bridge 620. The crossbar may be an optical crossbar or an electrical crossbar. If the switch 630 is an optical crossbar, optical engines configured to convert electrical signals into optical signals are located on the blades of the ASSP block 610 and of the media bridge 620. In the following description the term optical crossbar is used for the switch 630, without limiting the scope of the embodiments.

Initially, a blade 625 of the media bridge 620 is connected to a blade 612 of the ASSP block 610. A PHY device is located on the blade 625 and a first MAC device is located on the blade 612. When a reconfiguration becomes necessary due to either a planned reason (e.g., an upgrade) or an unplanned reason (e.g., a failure), the blade 612 which is in an ACTIVE state and a blade 618 that is going to be connected to the blade 625 at the end of the reconfiguration process and that initially is in a STANDBY state need to be made aware of the upcoming changes. In the following description existence of a multi-state machine is implied. However, the names and exact description is exemplary and not intended to be limiting. It should also be noted that a MAC device located on an ASSP blade may provide functions related to the Physical layer besides the functions characteristic for the Data Link layer.

The following steps are intended to provide a detailed description of the sequence of events during the run-time replacing (i.e., reassigning) of the connection between the PHY device located on the I/O blade 625 and the first MAC device located on the ASSP (forward or control) blade 612, with a connection between the PHY device located on the I/O blade 625 and a second MAC device located on the ASSP (forward or control) blade 618, according to a first strategy and using the RF message. A connection between a MAC device and a PHY device may include a transmission (TX) line and a reception (RX) line.

Step #1: Initially a normal ingress/egress traffic flows to/from the ASSP blade 612 which is in an "ACTIVE" state, while the ASSP blade 618 is powered-on but not used, i.e., in a "STANDBY" state. The optical crossbar 630 is configured to connect the ASSP blade 612 to the I/O blade 625, while the ASSP blade 618 is disconnected and continuously transmits no-remote traffic indications, such as, RF messages. The system 600 is then configured for sending packets towards the PHY device on the I/O blade 625 via the MAC device on the ASSP blade 618 instead of sending the packets via the MAC device on the ASSP blade 612. Due to this new traffic configuration, all packets are buffered by the ASSP blade 618 until the reconfiguration is completed and the packets can be sent to the PHY device on the I/O blade 625.

Step #2: Since all new requests for sending packets are now redirected to the ASSP blade 618, the ASSP blade 612 is now requested to empty its packet buffer in view of the upcoming reconfiguration of the connection towards the PHY device on the I/O blade 625. Once the packet buffer of the ASSP blade 612 is empty, the ASSP blade 612 schedules a "stoppage" of egress traffic, followed by interrupting of the TX line of the ASSP blade 612, via the optical crossbar 630.

Step #3: When the TX line of ASSP blade 612 is interrupted, a remote BRIDGE PORT, e.g. an Ethernet switch (not shown) of the remote system, detects a local fault on its RX line and start sending no-remote-traffic indications, i.e., REMOTE FAULT (RF) messages, possibly interrupting an ongoing transmission of a scheduled packet towards the system 600. Therefore, the packet may be truncated, which would result in the loss of that packet. Assuming that the reconfiguration process is completed before packet buffers are filled with pending packets, the packet that was truncated because of the interruption should be the only packet lost during the reconfiguration.

Step #4: Upon receiving an RF message on the currently uninterrupted RX line, the ASSP blade 612 interrupts its RX line towards the OXC switch 630. The OXC switch 630 is controlled to connect the RX/TX lines from the PHY device on the I/O blade 625 to the ASSP blade 618, which then also receives RF messages from the directly connected BRIDGE PORT, e.g. via an Ethernet switch.

Step #5: The ASSP blade 618 receives and transmits IDLE PATTERNS for a time interval necessary to validate the new interconnection, after which the MAC device on the ASSP blade 618 and the MAC device of a remote system connected to the system 600 via a media and the PHY device on the I/O blade 625 are switched into an "ACTIVE" state, pursuing transmission of buffered traffic.

Figure 12:
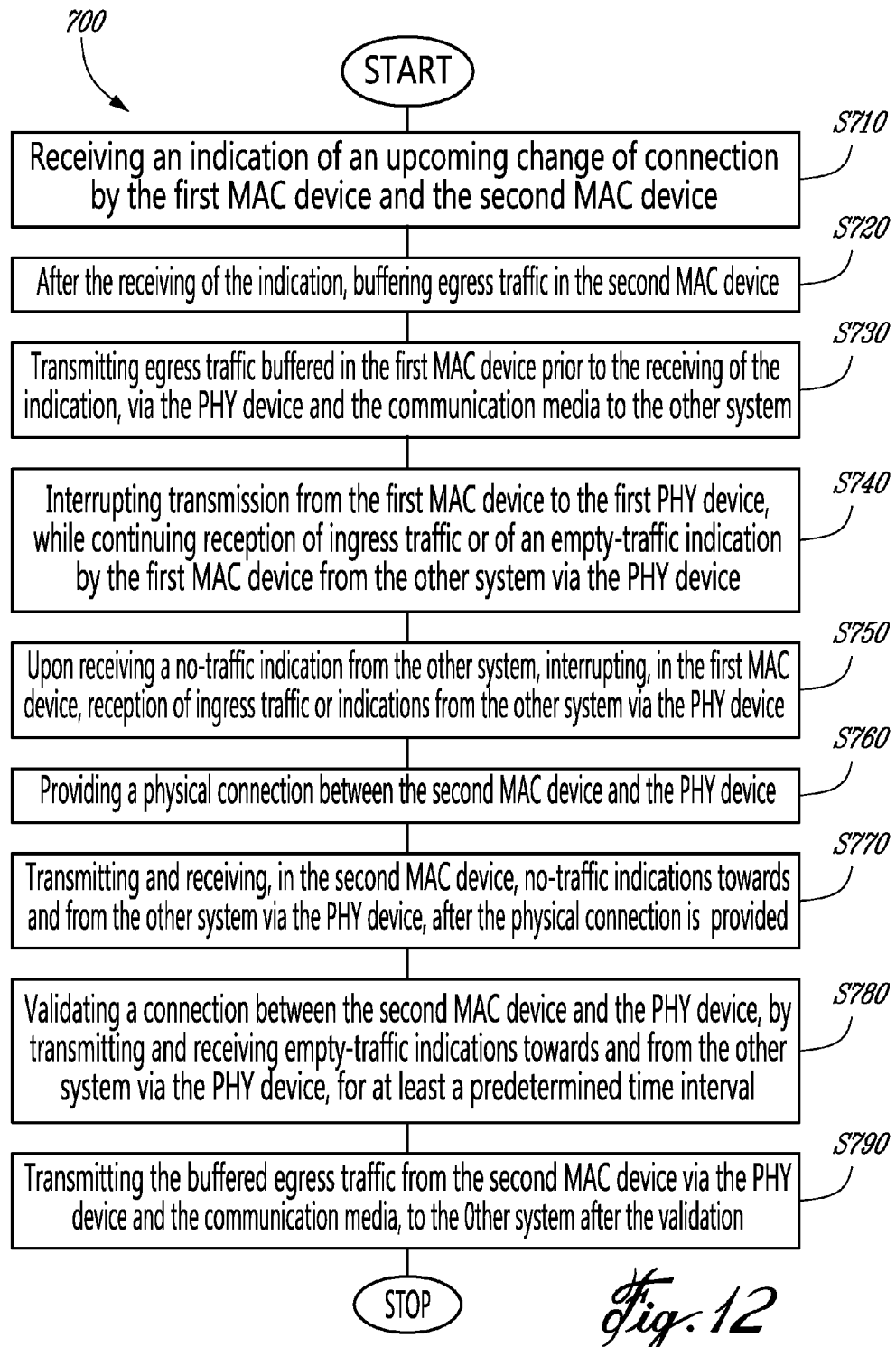
FIG. 12 is a schematic diagram of a method based on the first strategy according to an embodiment.

Based on the above-described steps, in a more general view, a flow chart of a method 700 for switching a device of a system linked via a communication media to a remote system, from the device being connected to a first processing device to the device being connected to a second processing device is illustrated in FIG. 12. For purposes of illustration and not of limitation, in the following description the device is named PHY device, the first processing device is named MAC device and the second processing device is named second MAC device. Although these devices may be PHY or MAC devices as commercially available in view of the standardized specification, these names and features are not intended to limit the features of this embodiment.

The method 700 includes receiving an indication of an upcoming change of connection by the first MAC device and the second MAC device, at S710, and buffering egress traffic in the second MAC device, after the receiving of the indication at S720. The method 700 further includes transmitting egress traffic buffered in the first MAC device prior to the receiving of the indication, via the PHY device and the communication media to the remote system, at S730, and interrupting transmission from the first MAC device to the first PHY device, while continuing reception of ingress traffic or of an empty-traffic indication by the first MAC device from the remote system via the PHY device, at S740. The method 700 also includes interrupting, in the first MAC device, reception of ingress traffic or indications from the remote system via the PHY device, upon receiving a no-remote-traffic indication from the remote system, at S750.

The method 700 then includes providing a physical connection between the second MAC device and the PHY device, at S760, and transmitting and receiving, in the second MAC device, no-remote-traffic indications towards and from the remote system via the PHY device, after the physical connection is provided, at S770. The method 700 finally includes validating a connection between the second MAC device and the PHY device, by transmitting and receiving empty-traffic indications towards and from the remote system via the PHY device, for at least a predetermined time interval, at S780, and then transmitting the buffered egress traffic from the second MAC device via the PHY device and the communication media, to the remote system after the validating, at S790.

The PHY device, the first MAC device, and the second MAC device may be connected to a reconfigurable crossbar. The reconfigurable crossbar may be an optical crossbar, and, in this case, the method 700 may also include converting electrical signals corresponding to ingress or egress traffic and indications into and from optical signals before being communicated between the PHY device the first MAC device or the second MAC device via the optical crossbar.

The PHY device may have a transmission line and a reception line initially connected to a first transmission line and a first reception line of the first MAC device, respectively, and then connected to a second transmission line and a second reception line of the second MAC device, respectively. The transmission line and the reception line of the PHY device, the first transmission line and the first reception line of the first MAC device, and the second transmission line and the second reception line of the second MAC device may be connected to a reconfigurable crossbar. In this case, if reconfigurable crossbar is an optical crossbar, the method may further include converting electrical signals corresponding to traffic and indications to and from optical signals before being communicated between the PHY device, the first MAC device or the second MAC device via respective transmission and reception lines connected to the optical crossbar. The first MAC device may interrupt the first transmission line upon emptying buffers storing the egress traffic buffered prior to the receiving of the indication of the upcoming change of connection. Also, the first MAC device and the second MAC device send "Remote Fault" (RF) indications via the first transmission line or the second transmission line, respectively, if no traffic or indications are received on the first reception line or the second reception line, respectively. The no-remote-traffic indication received from the remote system may also be an RF indication. The empty-traffic indications may be an IDLE PATTERN.

Figure 13:
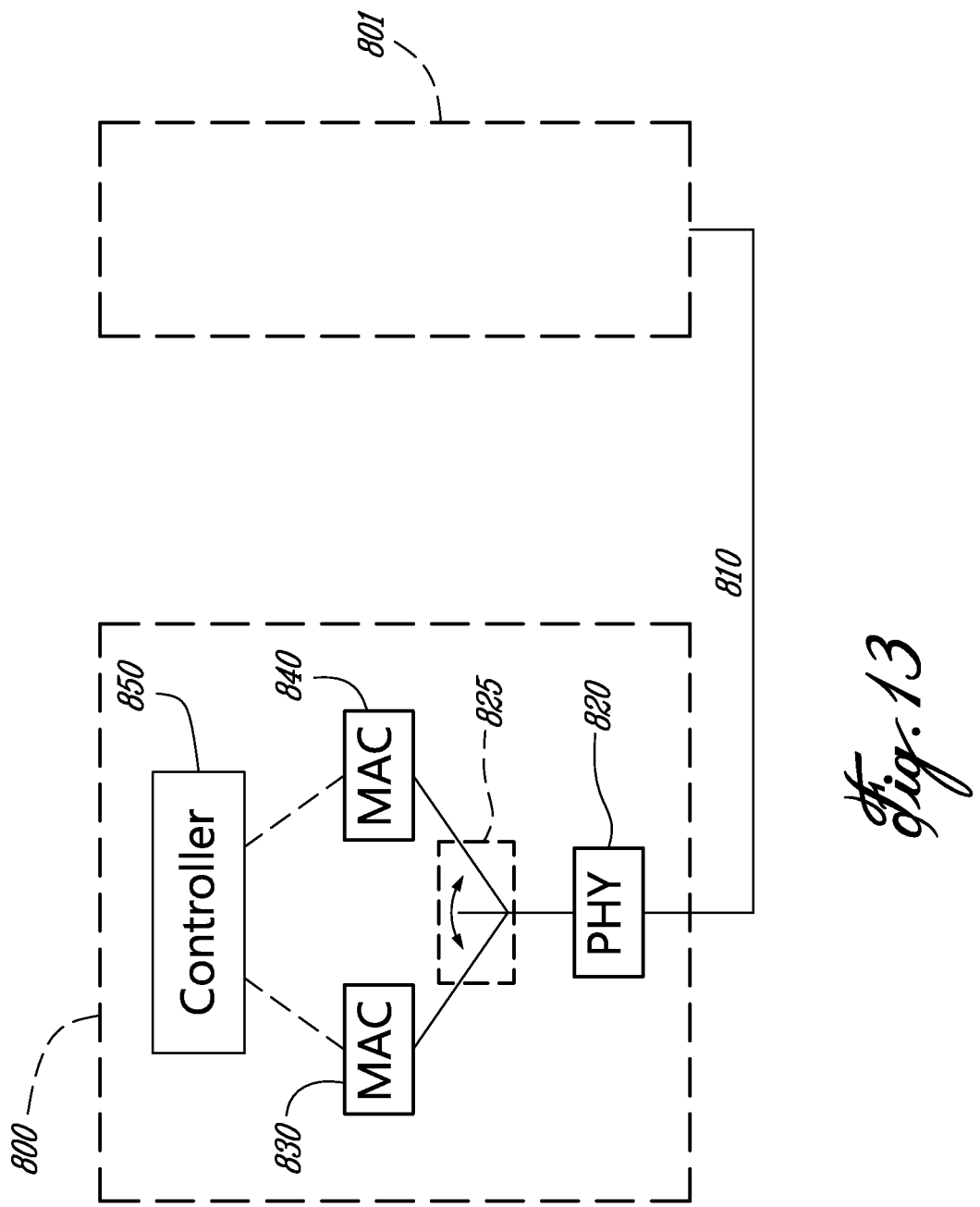
FIG. 13 is a schematic diagram of a system according to an exemplary embodiment.

The method 700 may be executed in a system 800 schematically illustrated in FIG. 13, according to another exemplary embodiment. The system 800 is connected to a remote system 801 via a communication media 810. The system 800 includes a physical (PHY) device 820 connected to the communication media 810 and configured (1) to forward egress traffic and indications received from a first MAC device 830 or from a second MAC device 840, towards the remote system 801, via the communication media 810, and (2) to forward ingress traffic and indications received from the remote system 801, via the communication media 810, towards the first MAC device 830 or the second MAC device 840.

The system 800 thus includes the first MAC device 830 initially connected to the PHY device 820 and configured to buffer and forward egress traffic and indications to be transmitted to the remote system 801, via the PHY device 820, and to receive ingress traffic and indications from the remote system 801 via the PHY device 820. The system 800 also includes the second MAC device 840 configured to be connected to the PHY device 820, to buffer and forward egress traffic and indications to be transmitted to the remote system 801 via the PHY device 820, and to receive ingress traffic and indications from the remote system 801 via the PHY device 820.

The system 800 also includes a controller 850 connected to the first MAC device 830 and to the second MAC device 840, at least temporarily while the system 800 switches from having the PHY device 820 connected to the first MAC device 830, to having the PHY device 820 connected to the second MAC device 840. The controller is configured to control the first MAC device 830 and the second MAC device 840 while the system 800 switches by (1) sending an indication of an upcoming change of connection to the first MAC device 830 and the second MAC device 840, (2) redirecting egress traffic of the system 800 from the first MAC device 830 to the second MAC device 840 after sending the indication, (3) controlling the first MAC device 830 and (4) controlling the second MAC device 840 in the manners described below. The controller 850 controls the first MAC device 830 to transmit egress traffic buffered in the first MAC device 830 prior to receiving the indication of the upcoming change of connection, via the PHY device 820 and the communication media 810, to the remote system 801, after the receiving of the indication, to stop transmitting any traffic or indications towards the first PHY device 820, while continuing to receive ingress traffic or empty-traffic indications from the remote system 801 via the PHY device 820 and the communication media 801, until a no-remote-traffic indication is received from the remote system 801, and to interrupt a connection with the PHY device 820 upon receiving the no-remote-traffic indication from the remote system 801 via the PHY device 820 and the communication media 810.

Further the controller 850 controls the second MAC device 840 to buffer the egress traffic therein, after receiving the indication of the upcoming change of connection, to transmit no-remote-traffic indications until receiving a no-remote-traffic indication from the remote system 801, to validate communication with the remote system 801 via the PHY device 820 by transmitting and receiving empty-traffic indications for at least a predetermined time interval, after receiving the no-remote-traffic indication from the remote system 801 via the PHY device 820, and to transmit the buffered traffic via the PHY device 820 and the communication media 810 to the remote system 801, after the communication has been validated.

In this context, the no-remote-traffic indications may be "REMOTE FAILURE" messages and the empty-traffic indications may be "IDLE-PATTERNS."

The system 800 may further include a switch 825 connected to the PHY device 820, the first MAC device 830, and the second MAC device 840, the switch 825 being configured to initially provide a first physical connection between the PHY device 820 and the first MAC device 840, and then to provide a second physical connection between the PHY device 820 and the second MAC device 840. The switch 825 may be a reconfigurable crossbar. Moreover the reconfigurable crossbar may be an optical crossbar. If the PHY device 820, the first MAC device 830, and the second MAC device 840 are connected via an optical crossbar (i.e., the switch 825), the system 800 may further include (1) a first optical engine device connected between the first MAC device 830 and the optical crossbar 825 and configured to convert electrical signals corresponding to traffic and indications to and from the first MAC device 830, into optical signals, (2) a second optical engine device connected between the second MAC device 840 and the optical crossbar 825 and configured to convert electrical signals corresponding to traffic and indications to and from the second MAC device 840, into optical signals, and (3) a PHY optical engine device connected between the PHY device 820 and the optical crossbar 825 and configured to convert electrical signals corresponding to traffic and indications to and from the PHY device 820, into optical signals.

In some embodiment, the PHY device 820 is configured to be connected to the remote system 801 via the communication media 810 according to an Ethernet communication protocol. The Ethernet communication protocol may be a standard protocol that enables 10 Gbps, 40 Gbps or 100 Gbps to be transmitted using the communication media 810.

The first MAC device 830 and the second MAC device 840 may be located on different blades (e.g., 612 and 618 in FIG. 11) of a processing blade block such as 520 or 530 in FIG. 9 or 610 in FIG. 11. The PHY device 820 may then be located on an I/O blade (e.g., 625) of a media bridge block such as 620 in FIG. 11 or 510 in FIG. 9. The system 800 may further include a crossbar switch (e.g., 540 in FIG. 9 or 650 in FIG.

11) connected between the processing blade block and the media bridge. If the crossbar switch is an optical crossbar, the system 800 may further comprise optical engines located on the blades on which the first MAC device 830, the second MAC device 840 and the PHY device 820 are respectively located, the optical engines being connected between a respective device and the optical crossbar and being configured to convert electrical signals corresponding to traffic and indications to and from the respective device, into or from optical signals.

Figure 14:
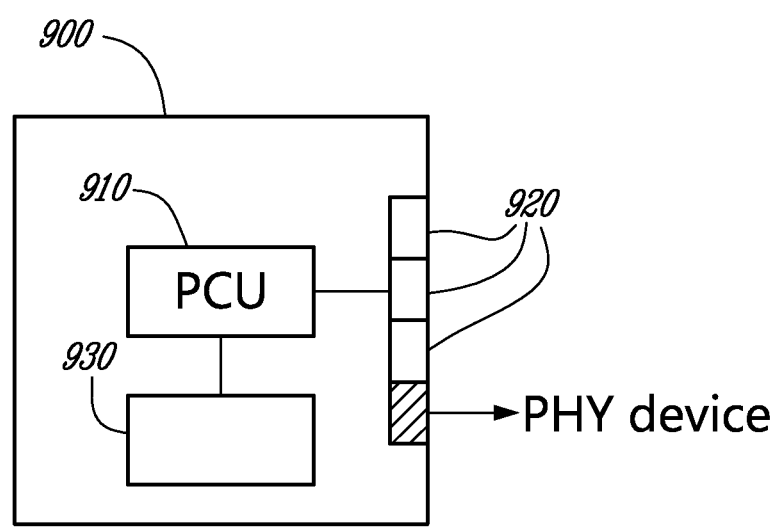
FIG. 14 is a schematic diagram of a device according to an exemplary embodiment.

The MAC device 830 and 840 may be similar MAC devices useable in a system (e.g., 800) communicating with a remote system (e.g., 801), the devices being configure to enable performing the method 700 when a connection between a PHY device and the device changes. FIG. 14, illustrates a schematic diagram of a MAC device 900 according to another exemplary embodiment. The MAC device 900 has a processor 910 and a plurality of communication ports 920, one of which is configured to be connected to a PHY device (e.g., 820 in FIG. 13). The MAC device 900 may also include a computer readable storage medium 930 (e.g. a memory) capable to store executable codes for performing methods according to various embodiments. The processor 910 is configured (1) to receive an indication of an upcoming change of connection related to an existing connection with a PHY device of the system, (2) to transmit egress traffic buffered prior to receiving the indication of the upcoming change, via the PHY device to the remote system, (3) to interrupt transmission towards the first PHY device, while continuing reception of ingress traffic or of an empty-traffic indication after finishing transmitting the egress traffic buffered prior to receiving the indication of the upcoming change, (4) to interrupt reception from the PHY device upon receiving an indication that the remote system no longer receives any traffic or indications after interrupting the transmission, (5) to buffer egress traffic received after receiving an indication of an upcoming new connection with a PHY device, (6) to transmit indications that no traffic or indications are received after receiving the indication of the upcoming new connection with a PHY device and no traffic or indications has been received, and (7) to transmit empty-traffic indications for a predetermined time interval before starting to transmit the buffered traffic towards the remote system, after receiving traffic or indications following receiving the indication of the upcoming new connection with a PHY device Description of Embodiments Incorporating a Second Strategy In some embodiments, a 'Pause' message is used in a system configured to accommodate the remapping of I/O blades to different Application-Specific Standard Product (ASSP) blades, in the event of a planned remapping, or reconfiguration, of the association between an I/O blade and an ASSP blade. In this scenario, no packet is lost during the rerouting of traffic from the I/O blade via a new ASSP blade may result in at most one single packet loss.

Figure 15:
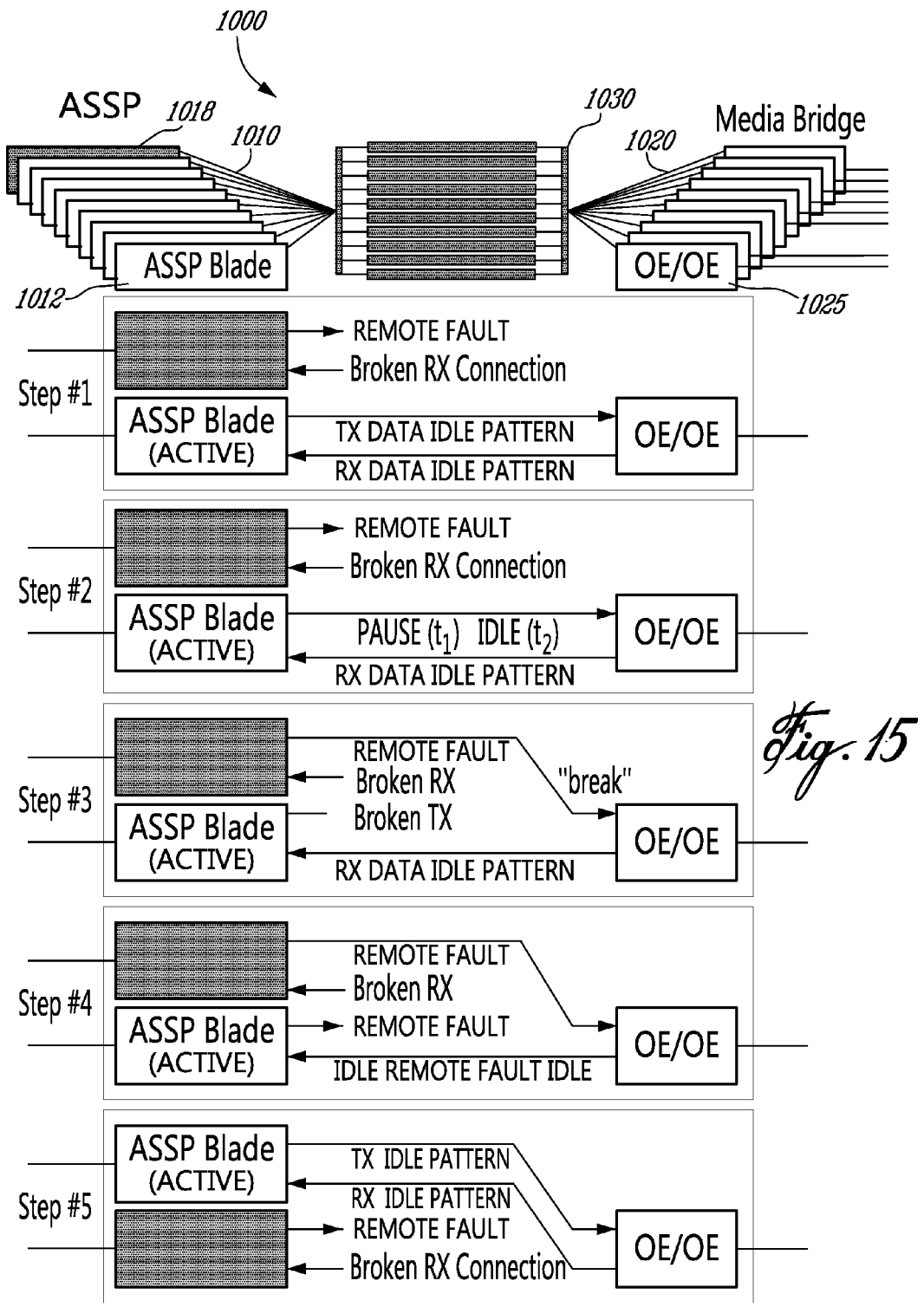
FIG. 15 is a sequence diagram of a second strategy according to an exemplary embodiment.

A logical sequence of events during a run-time reassigning of a connection between a PHY device located on an I/O blade and a MAC device located on a forward or control blade using the 'Pause' message is illustrated in FIG. 15. The method according to a second strategy focuses on the events triggered by physically disconnecting a PHY device and a MAC device, while assuming that the crossbar device is timely reconfigured in order to remove the initial link and establish the new link between the respective devices (blades).

A system 1000 includes an ASSP block 1010 and a media bridge 1020. The ASSP block 1010 includes a plurality of ASSP blades and the media bridge 1020 includes a plurality of I/O blades. A switch 1030 is located between the ASSP block 1010 and the media bridge 1020. The switch 1030 is configured to enable switching a connection between one of the I/O blades (e.g. 1025) and one of the ASSP blades (e.g., 1012) with a connection between the one I/O blade (e.g., 625) and another ASSP blade (e.g., 1018). However, practically the switch 1030 may be a crossbar that enables interconnecting the ASSP blades of the ASSP block 1010 with the I/O blades of the Media Bridge 1020. The crossbar may be an optical crossbar or an electrical crossbar. If the switch 1030 is an optical crossbar, optical engines configured to convert electrical signals into optical signals are located on the blades of the ASSP block 1010 and of the media bridge 1020. In the following description the term optical crossbar may be used for the switch 1030, without limiting the scope of the embodiments.

Initially, a blade 1025 of the media bridge 1020 is connected to a blade 1012 of the ASSP block 1010. A PHY device is located on the blade 1025 and a first MAC device is located on the blade 1012. When a reconfiguration becomes necessary due to either a planned reason (e.g., an upgrade) or an unplanned reason (e.g., a failure), the blade 1012 which is in an ACTIVE state and a blade 1018 that is going to be connected to the blade 1025 at the end of the reconfiguration process and that initially is in a STANDBY state need to be made aware of the upcoming changes. In the following description existence of a multi-state machine is implied. However, the names and exact description is exemplary and not intended to be limiting. It should also be noted that a MAC device located on an ASSP blade may provide functions related to the Physical layer besides the functions characteristic for the Data Link layer.

The following steps are intended to provide a detailed description of the sequence of events during the run-time replacing (i.e., reassigning) of the connection between the PHY device located on the I/O blade 1025 and the first MAC device located on the ASSP (forward or control) blade 1012, with a connection between the PHY device located on the I/O blade 1025 and a second MAC device located on the ASSP (forward or control) blade 1018, according to a second strategy and using the 'Pause' message. A connection between a MAC device and a PHY device may include a transmission (TX) line and a reception (RX) line.

Step #1: Initially a normal ingress/egress traffic flows to/from the ASSP blade 1012 which is in an "ACTIVE" state, while the ASSP blade 1018 is powered-on but not used, i.e., in a "STANDBY" state. The optical crossbar 1030 is configured to connect the ASSP blade 1012 to the I/O blade 1025, while the ASSP blade 1018 is disconnected and continuously transmits no-remote-traffic indications (e.g., RF messages). The system 1000 is then configured for sending packets towards the PHY device on the I/O blade 1025 via the MAC device on the ASSP blade 1018 instead of sending the packets via the MAC device on the ASSP blade 1012. Due to this new traffic configuration, all packets are buffered by the ASSP blade 1018 until the reconfiguration is completed and the packets can be sent to the PHY device on the I/O blade 1025.

Step #2: Since all new requests for sending packets are now redirected to the ASSP 1018, the ASSP 1012 is now requested to empty its packet buffer for the connection being reconfigured. Once the packet buffer of the ASSP blade 1012 is empty, the ASSP blade 1012 schedules a "stoppage" of egress traffic, followed by interrupting of the TX line of the ASSP blade 1012, via the optical crossbar 1030. Then (different from the first strategy), the ASSP blade 1012 sends a 'PAUSE' message. The PAUSE message is used to request the remote system to stop sending packets for a period of time corresponding to PAUSE_SIZE bytes. The value of the PAUZE_SIZE is specified in the request (i.e., PAUSE message). The value of the PAUSE_SIZE is at least equal to the Maximum Transmission Unit size plus an extra guard time in order to account for a potential response and detection of a local fault.

Upon receiving a PAUSE message, a remote BRIDGE PORT, e.g. an Ethernet switch (not shown) of the remote system completes transmitting the current in-flight packet, followed by pausing egress traffic transmissions for a period at least equal in duration to PAUSE_SIZE, during which packets of egress traffic from the remote system are buffered.

After sending the PAUSE message, the ASSP blade 1012, sends a stream of empty-traffic indications (e.g., IDLE_PATTERNS) to allow for a "guard time" period before interrupting the TX line. The submission of this stream of empty-traffic indications delays detection of a local fault at the BRIDGE PORT (e.g., an Ethernet switch) while egress traffic from the remote system towards the system 1000 may be in-flight. A value of the IDLE_SIZE (during which the stream of IDLE_PATTERNS are sent) is (A) at least equal to the MTU size plus an extra guard time in order to account for a response, and (B) smaller than the value of the PAUSE_SIZE, in order to make sure that the LOCAL FAULT can be detected before buffered packets start being sent because of the expiration of the quiet period requested by the PAUSE message.

Step #3: The ASSP blade 1012 triggers interrupting of its TX-link, via the optical crossbar 1030, and connecting the TX-link to the ASSP blade 1018. While receiving no traffic, the BRIDGE PORT of the remote system detects a LOCAL FAULT event, and, therefore starts sending no-remote-traffic indications, such as REMOTE FAULT messages. It is important that switching of the physical connection takes long enough for the remote system to detect a LOCAL FAULT. Furthermore, maintaining the transmission connection of the ASSP blade 1012 after sending the PAUSE message, results in no-remote traffic indications (i.e., REMOTE FAILURE messages) being forwarded to the remote BRIDGE PORT, which makes the BRIDGE PORT to transmit IDLE PATTERNS towards system 1000.

Step #4: Upon detecting of a no-remote-traffic indication (REMOTE FAULT message), the ASSP blade 1012 interrupts the reception line via the optical crossbar 1030. The optical crossbar is further controlled to connect a reception line of the ASSP blade 1018, which results in the ASSP blade receiving no-remote-traffic indications (i.e., REMOTE FAULT messages) from the BRIDGE PORT (e.g. an Ethernet switch) of the remote system.

Step #5: Upon receiving no-remote-traffic indications (i.e., REMOTE FAULT messages), both the ASSP blade 1018 and the ASSP blade 1012 start sending of empty-traffic indications (e.g., IDLE PATTERNS) towards the remote system, which includes the BRIDGE PORT. After a validation period of consistently receiving empty-traffic indications (e.g., IDLE PATTERNS), a connection between the system 1000 and the remote system is validated, and the traffic buffered during the reconfiguration process starts being transmitted.

Figure 16A:
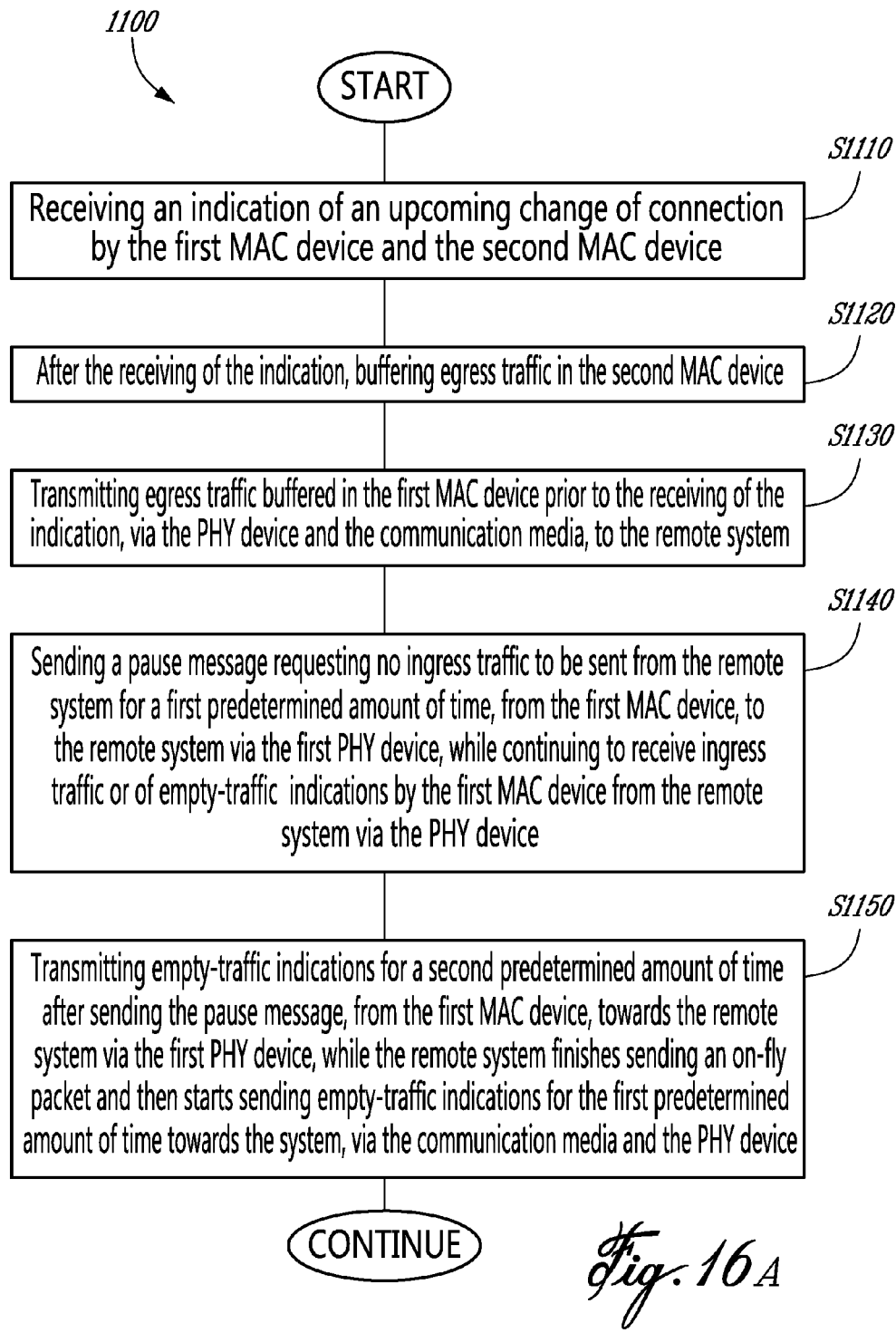
FIGS. 16A and 16B are a schematic diagram of a method based on the second strategy according to an exemplary embodiment.
Figure 16B:
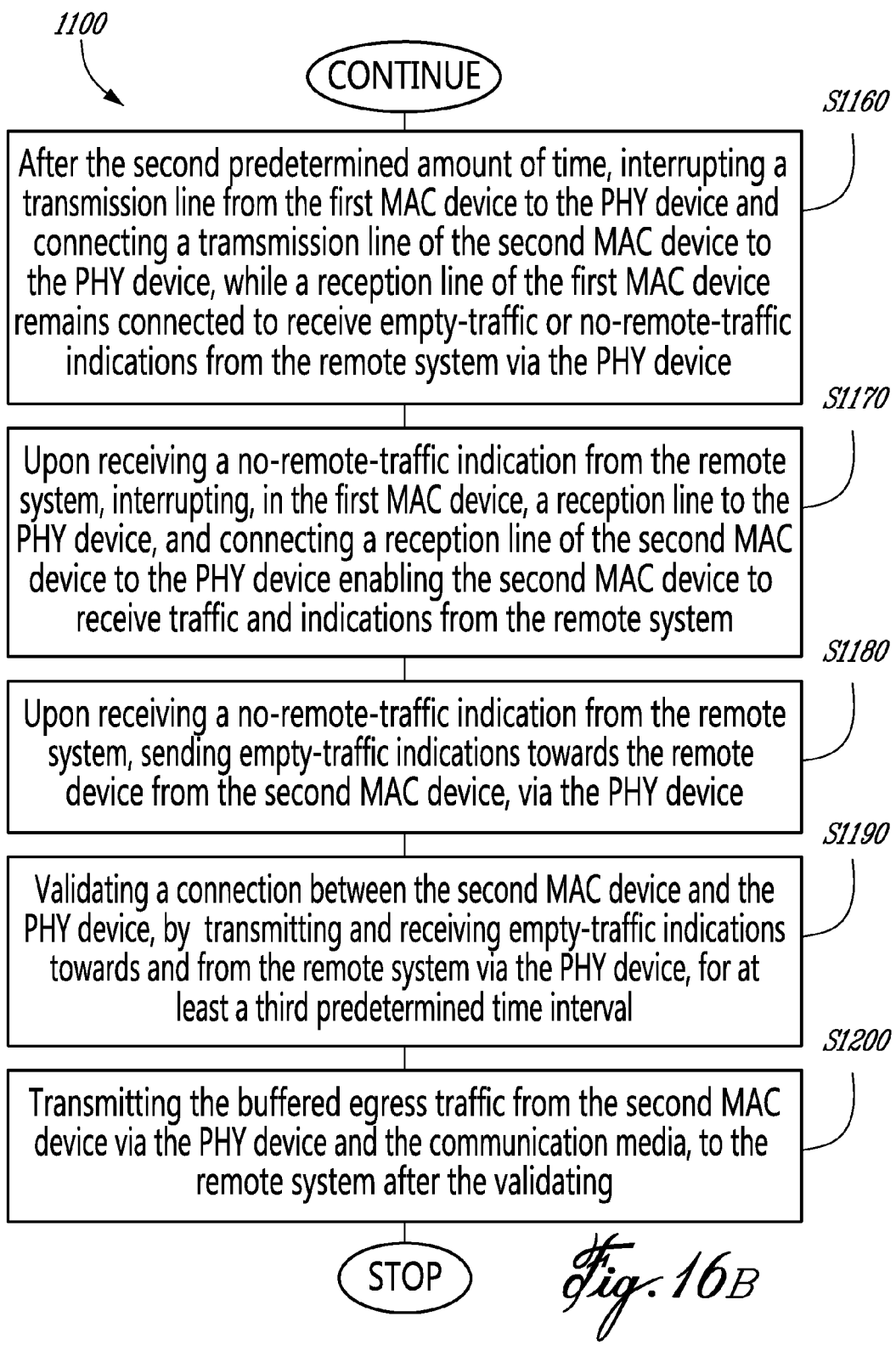

Based on the above-described steps, in a more general view, a flow chart of a method 1100 for switching a physical (PHY) device of a system linked via a communication media to a remote system, from being connected to a first processing (MAC) device to the device being connected to a second processing (MAC) device is illustrated in FIGS. 16A and 16B. For purposes of illustration and not of limitation, in the following description the device is named PHY device, the first processing device is named MAC device and the second processing device is named second MAC device. Although these devices may be PHY or MAC devices as commercially available in view of the standardized specification, these names and features are not intended to limit the features of the embodiments.

The method 1100 includes receiving an indication of an upcoming change of connection by the first MAC device and the second MAC device, at S1110, and after the receiving of the indication, buffering egress traffic in the second MAC device, at S1120. The method 1100 further includes transmitting egress traffic buffered in the first MAC device prior to the receiving of the indication, via the PHY device and the communication media, to the remote system, at S1130.

At S1140, the method 1100 includes sending a pause message requesting no ingress traffic to be sent from the remote system for a first predetermined amount of time, from the first MAC device, to the remote system via the first PHY device, while continuing to receive ingress traffic or of empty-traffic indications by the first MAC device from the remote system via the PHY device.

Further, the method 1100 includes transmitting empty-traffic indications for a second predetermined amount of time after sending the pause message, from the first MAC device, towards the remote system via the first PHY device, while the remote system finishes sending an in-flight packet and then starts sending empty-traffic indications for the first predetermined amount of time towards the system, via the communication media and the PHY device, at S1150. After the second predetermined amount of time has elapsed, the method 1100 includes interrupting a transmission line from the first MAC device to the PHY device and connecting a transmission line of the second MAC device to the PHY device, while a reception line of the first MAC device remains connected to receive empty-traffic or no-remote-traffic indications from the remote system via the PHY device, at S1160.

At S1170, the method 1100 includes, interrupting, in the first MAC device, a reception line to the PHY device, and connecting a reception line of the second MAC device to the PHY device enabling the second MAC device to receive traffic and indications from the remote system, upon receiving a no-remote-traffic indication from the remote system. Then, the method 1100 includes validating a connection between the second MAC device and the PHY device, by transmitting and receiving empty-traffic indications towards and from the remote system via the PHY device, for at least a third predetermined time interval, at S1180. Finally, the method 1100 includes transmitting the buffered egress traffic from the second MAC device via the PHY device and the communication media, to the remote system after the validating, at S1190.

In the context of method 1100, the PHY device, the first MAC device, and the second MAC device may be connected to a reconfigurable crossbar. Moreover, the crossbar is an optical crossbar, situation in which the method 1100 further includes converting electrical signals corresponding to ingress or egress traffic and indications into and from optical signals before being communicated between the PHY device and the first MAC device or the second MAC device via the optical crossbar.

The first predetermined amount of time may exceed a maximum transmission unit used during communication between the system and the remote system. The second predetermined amount of time may be larger than a maximum transmission unit used during communication between the system and the remote system, but smaller than the first predetermined amount of time. The no-remote-traffic indications may be "REMOTE FAILURE" messages issued by one of the first MAC device, the second MAC device or received from the remote system when no traffic or indication is received for a receipt-error time interval. The empty-traffic indications may be "IDLE-PATTERNS."

The method 1100 may be executed in a system 800 schematically illustrated in FIG. 13, according to another exemplary embodiment. In order to perform the method 1100, the a physical (PHY) device 820 connected to the communication media 801 is configured (1) to forward egress traffic and indications received from a first MAC device 830 or from a second MAC device 840, towards the remote system 801, via the communication media 810, and (2) to forward ingress traffic and indications received from the remote system 801, via the communication media 810, towards the first MAC device 830 or the second MAC device 840.

The first MAC device 830 initially connected to the PHY device 820 is configured to buffer and forward egress traffic and indications to be transmitted to the remote system 801, via the PHY device 820, and to receive ingress traffic and indications from the remote system 801 via the PHY device 820. The second MAC device 840 to be connected to the PHY device 820 is configured to buffer and forward egress traffic and indications to be transmitted to the remote system 801 via the PHY device 820, and to receive ingress traffic and indications from the remote system 801 via the PHY device 820.

Further, the system 800 configured to be able to perform the method 1100, includes a switch 825 connected to the PHY device 820, the first MAC device 830, and the second MAC device 840 and configured to initially provide a first physical connection between the PHY device 820 and the first MAC device 830, and then to provide a second physical connection between the PHY device 820 and the second MAC device 840.

The system 800 also includes a controller 850 connected at least temporarily to the first MAC device 830, to the second MAC device 840, and to the switch 825 and configured to control the first MAC device 830, the second MAC device 840 and the switch 825 while the system 800 switches from having the PHY device 820 connected to the first MAC device 830, to having the PHY device 820 connected to the second MAC device 840. The controller 850 sending an indication of an upcoming change of connection to the first MAC device 830 and the second MAC device 840, and then redirects egress traffic of the system 800 from the first MAC device 830 to the second MAC device 840.

The controller 850 controls the first MAC device 830
  to transmit egress traffic buffered in the first MAC device 830 prior to receiving the indication of the upcoming change of connection, via the PHY device 820 and the communication media 810, to the remote system 801, after receiving the indication,
  to send a pause message requesting no ingress traffic for a first predetermined amount of time to the remote system 801, while continuing to receive ingress traffic or empty-traffic indications from the remote system 801 via the PHY device 820, and
  to transmit empty-traffic indications for a second predetermined amount of time after sending the pause message towards the remote system via the first PHY device 820.

Further, the controller 850 controls the second MAC device 840
  to buffer the egress traffic therein, after receiving the indication of the upcoming change of connection,
  to transmit no-remote-traffic indications until receiving a no-remote-traffic indication from the remote system 801,
  to validate communication with the remote system 801 via the PHY device 820 by transmitting and receiving empty-traffic indications for at least a predetermined time interval, after receiving the no-remote-traffic indication from the remote system 801 via the PHY device 820, and
  to transmit the buffered traffic via the PHY device 820 and the communication media 810 to the remote system 801, after the communication has been validated.

The controller 850 also controls the switch 825
  to interrupt a transmission line between the first MAC device 830 and the PHY device 820 and to connect a new transmission line between the second MAC device 840 and the PHY device 820 after the second predetermined has elapsed, and
  to interrupt a reception line between the first MAC device 830 and the PHY device 820 to connect a new reception line between the second MAC device 840 and the PHY device 820 when a no-remote-traffic indication is received from the remote system 801.

The switch 825 may be a reconfigurable crossbar. Moreover, the switch 825 may be an optical crossbar. If the switch 825 is an optical crossbar, the system 800 may further include
  (1) a first optical engine device connected between the first MAC device 830 and the optical crossbar and configured to convert electrical signals corresponding to traffic and indications to and from the first MAC device, into and from optical signals;
  (2) a second optical engine device connected between the second MAC device 840 and the optical crossbar and configured to convert electrical signals corresponding to traffic and indications to and from the second MAC device, into and from optical signals; and
  (3) a PHY optical engine device connected between the PHY device 820 and the optical crossbar and configured to convert electrical signals corresponding to traffic and indications to and from the PHY device, into and from optical signals.

The PHY device 820 may be configured to be connected to the remote system 801 via the communication media 810 according to an Ethernet communication protocol. The Ethernet communication protocol may enable one of a Gbps, 40 Gbps and 100 GBps speed to be transmitted using the communication media 810.

The first MAC device 830 and the second MAC device 840 may be located on different blades (e.g., 1012 and 1018 in FIG. 16) of a processing blade block such as 520 or 530 in FIG. 9 or 1010 in FIG. 16. The PHY device 820 may then be located on an I/O blade (e.g., 1125) of a media bridge block such as 1120 in FIG. 16 or 510 in FIG. 9. The system 800 may further include a crossbar switch (e.g., 540 in FIG. 9 or 1150 in FIG. 16) connected between the processing blade block and the media bridge. If the crossbar switch is an optical crossbar, the system 800 may further comprise optical engines located on the blades on which the first MAC device 830, the second MAC device 840 and the PHY device 820 are respectively located, the optical engines being connected between a respective device and the optical crossbar and being configured to convert electrical signals corresponding to traffic and indications to and from the respective device, into or from optical signals.

The MAC device 830 and 840 may be similar MAC devices useable in a system (e.g., 800) communicating with a remote system (e.g., 801), the devices being configure to enable performing the method 1100 when a connection between a PHY device and the device changes. The MAC device 900 in FIG. 14 having a processor 910 and a plurality of communication ports 920, one of which is configured to be connected to a PHY device (e.g., 820 in FIG. 13), may be capable to operate according to the second strategy. In such an exemplary embodiment, the processor 910 is configured (1) to receive an indication of an upcoming change of connection related to an existing connection of the MAC device with a PHY device of the system,
(2) to transmit egress traffic buffered prior to receiving the indication of the upcoming change, via the PHY device to the remote system,
(3) to send a pause message requesting no ingress traffic to be sent from the remote system (801) for a first predetermined amount of time while continuing to receive ingress traffic or of empty-traffic indications from the remote system via the PHY device,
(4) to transmit empty-traffic indications for a second predetermined amount of time after sending the pause message, towards the remote system via the first PHY device;
(5) to interrupt transmission towards the first PHY device, while continuing reception of ingress traffic or of an empty-traffic indication after the second predetermined amount of time,
(6) to interrupt reception from the PHY device upon receiving no-remote-traffic indication from the remote system,
(7) to buffer egress traffic received after receiving an indication of an upcoming new connection with a PHY device,
(8) to transmit no-remote-traffic indications after receiving the indication of the upcoming new connection with a PHY device and until traffic or indications are received, and
(9) after receiving traffic or indications from the remote system via the PHY device following the indication of the upcoming new connection with the PHY device, to validate the new connection by transmitting empty-traffic indications for a third predetermined time interval, before starting to transmit the buffered traffic towards the remote system.

Advantages of the Embodiment Using the First or the Second Strategy

Some embodiments using the first strategy (RF message) are able to dynamically reconfigure a connection between a PHY device and a MAC device in a system with a maximum loss of a single packet. Some embodiments using the second strategy (PAUSE message) are able to dynamically reconfigure a connection between a PHY device and a MAC device in a system with no packet loss.

These reassignment strategies "avoid" using two Round Time Trip messaging, which minimizes the restore in-service (run-time) time delay, transmission buffer size, and cost, which may be significant in the case of "long reach" interconnects.

Additionally, these reassignment strategies minimize the impact on remote systems of reconfiguring the association between a PHY device and a MAC device. By minimizing the time required to buffer packets on the remote systems, it is possible that any types of standard compliant equipment would provide a large enough packet buffer to avoid unnecessary packet loss.

The reassignment strategies require standard-based events and messages, such as the remote fault and pause messages. That means that no new events or messages are required to be specified.

By limiting packet loss, it becomes possible to use these reassignment strategies at run-time on a working system to provide system support functions such as upgrades, energy management, over provisioning, etc.

By using a reconfigurable crossbar device, it becomes possible to dynamically reconfigure it in order to break and make connections between any PHY and MAC devices. That means that a MAC device could detect the loss of connectivity with a PHY device by simply reconfiguring the crossbar device.

The disclosed exemplary embodiments provide methods, systems and devices according to two reassignment strategies. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer readable medium may be utilized including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software, or firmware tangibly embodied in a computer-readable storage medium for execution by a specifically programmed computer or processor.

What is claimed is:

1. A method (700) for switching a physical (PHY) device of a system linked via a communication media to a remote system, from being connected to a first processing (MAC) device to being connected to a second processing (MAC) device, the method comprising:

receiving (S710) an indication of an upcoming change of connection by the first MAC device and the second MAC device;

after the receiving of the indication, buffering (S720) egress traffic in the second MAC device;

transmitting (S730) egress traffic buffered in the first MAC device prior to the receiving of the indication, via the PHY device and the communication media to the remote system;

interrupting (S740) transmission from the first MAC device to the first PHY device, while continuing reception of ingress traffic or of an empty-traffic indication by the first MAC device from the remote system via the PHY device;

upon receiving (S750) a no-remote-traffic indication from the remote system, interrupting, in the first MAC device, reception of ingress traffic or indications from the remote system via the PHY device;

providing (S760) a physical connection between the second MAC device and the PHY device;

transmitting and receiving (S770), in the second MAC device, no-remote-traffic indications towards and from the remote system via the PHY device, after the physical connection is provided;

validating (S780) a connection between the second MAC device and the PHY device, by transmitting and receiving empty-traffic indications towards and from the remote system via the PHY device, for at least a predetermined time interval; and transmitting (S790) the buffered egress traffic from the second MAC device via the PHY device and the communication media, to the remote system after the validating.

2. The method of claim 1, wherein the PHY device, the first MAC device, and the second MAC device are connected to a reconfigurable crossbar.

3. The method of claim 2, wherein the reconfigurable crossbar is an optical crossbar, and the method further includes converting electrical signals corresponding to ingress or egress traffic and indications into and from optical signals before being communicated between the PHY device and the first MAC device or the second MAC device via the optical crossbar.

4. The method of claim 1, wherein the PHY device has a transmission line and a reception line initially connected to a first transmission line and a first reception line of the first MAC device, respectively, and then connected to a second transmission line and a second reception line of the second MAC device, respectively.

5. The method of claim 4, wherein the transmission line and the reception line of the PHY device, the first transmission line and the first reception line of the first MAC device, and the second transmission line and the second reception line of the second MAC device are connected to a reconfigurable crossbar.

6. The method of claim 5, wherein the reconfigurable crossbar is an optical crossbar, and the method further includes converting electrical signals corresponding to traffic and indications to and from optical signals before being communicated between the PHY device, the first MAC device or the second MAC device via respective transmission and reception lines connected to the optical crossbar.

7. The method of claim 4, wherein the first MAC device interrupts the first transmission line upon emptying buffers storing the egress traffic buffered prior to the receiving of the indication of the upcoming change of connection.

8. The method of claim 4, wherein the first MAC device and the second MAC device send "Remote Fault" (RF) indications via the first transmission line or the second transmission line, respectively, if no traffic or indications are received on the first reception line or the second reception line, respectively.

9. The method of claim 8, wherein the no-remote-traffic indication received from the remote system is an RF indication.

10. A system (800) connected to a remote system (801) via a communication media (810), comprising:

a physical (PHY) device (820) connected to the communication media (801) and configured (1) to forward egress traffic and indications received from a first MAC device (830) or from a second MAC device (840), towards the remote system (801), via the communication media (810), and (2) to forward ingress traffic and indications received from the remote system (801), via the communication media (810), towards the first MAC device (830) or the second MAC device (840);

the first MAC device (830) initially connected to the PHY device (820) and configured to buffer and forward egress traffic and indications to be transmitted to the remote system (801), via the PHY device (820), and to receive ingress traffic and indications from the remote system (801) via the PHY device (820);

the second MAC device (840) configured to be connected to the PHY device (820), to buffer and forward egress traffic and indications to be transmitted to the remote system (801) via the PHY device (820), and to receive ingress traffic and indications from the remote system (801) via the PHY device (820); and a controller (850) connected at least temporarily to the first MAC device (830) and to the second MAC device (840), and configured to control the first MAC device (830) and the second MAC device (840) while the system (800) switches from having the PHY device (820) connected to the first MAC device (830), to having the PHY device (820) connected to the second MAC device (840), by (1) sending an indication of an upcoming change of connection to the first MAC device (830) and the second MAC device (840), (2) redirecting egress traffic of the system (800) from the first MAC device (830) to the second MAC device (840) after sending the indication, (3) controlling the first MAC device (830)
 a. to transmit egress traffic buffered in the first MAC device (830) prior to receiving the indication of the upcoming change of connection, via the PHY device (820) and the communication media (810), to the remote system (801), after the receiving of the indication,
 b. to stop transmitting any traffic or indications towards the first PHY device (820), while continuing to receive ingress traffic or empty-traffic indications from the remote system (801) via the PHY device (820) and the communication media (810), until a no-remote-traffic indication is received from the remote system (801), and
 c. to interrupt a connection with the PHY device (820) upon receiving the no-remote-traffic indication from the remote system (801) via the PHY device (820) and the communication media (810), and (4) controlling the second MAC device (840)
 a. to buffer the egress traffic therein, after receiving the indication of the upcoming change of connection,
 b. to transmit no-remote-traffic indications until receiving a no-remote-traffic indication from the remote system (801),
 c. to validate communication with the remote system (801) via the PHY device (820) by transmitting and receiving empty-traffic indications for at least a predetermined time interval, after receiving the no-remote-traffic indication from the remote system (801) via the PHY device (820), and
 d. to transmit the buffered traffic via the PHY device (820) and the communication media (810) to the remote system (801), after the communication has been validated.

11. The system of claim 10, further comprising:
a switch connected to the PHY device, the first MAC device, and the second MAC device and configured to initially provide a first physical connection between the PHY device and the first MAC device, and then to provide a second physical connection between the PHY device and the second MAC device.

12. The system of claim 11, wherein the switch is a reconfigurable crossbar.

13. The system of claim 12, wherein the reconfigurable crossbar is an optical crossbar.

14. The system of claim 13, further comprising:
a first optical engine device connected between the first MAC device and the optical crossbar and configured to convert electrical signals corresponding to traffic and indications to and from the first MAC device, into optical signals;
a second optical engine device connected between the second MAC device and the optical crossbar and configured to convert electrical signals corresponding to traffic and indications to and from the second MAC device, into optical signals; and
a PHY optical engine device connected between the PHY device and the optical crossbar and configured to convert electrical signals corresponding to traffic and indications to and from the PHY device, into optical signals.

15. The system of claim 10, wherein the PHY device is configured to be connected to the remote system via the communication media according to an Ethernet communication protocol.

16. The system of claim 15, wherein the Ethernet communication protocol enables one of a 10 Gbps, 40 Gbps and 100 GBps speed.

17. The system of claim 10, wherein the first MAC device and the second MAC device are located on different blades of a processing blade block, and the PHY device is located on an I/O blade of a media bridge block.

18. The system of claim 17, wherein the system further comprises a crossbar switch connected between the processing blade block and the media bridge.

19. The system of claim 18, wherein the crossbar switch is an optical crossbar and the system further comprises optical engines located on the blades on which the first MAC device, the second MAC device and the PHY device are respectively located, the optical engines being connected between a respective device and the optical crossbar and being configured to convert electrical signals corresponding to traffic and indications to and from the respective device, into or from optical signals.

20. A MAC device (900) useable in a system communicating with a remote system, comprising:
a processor (910) configured
(1) to receive an indication of an upcoming change of connection related to an existing connection with a PHY device of the system,
(2) to transmit egress traffic buffered prior to receiving the indication of the upcoming change, via the PHY device to the remote system,
(3) to interrupt transmission towards the first PHY device, while continuing reception of ingress traffic or of an empty-traffic indication after finishing transmitting the egress traffic buffered prior to receiving the indication of the upcoming change,
(4) to interrupt reception from the PHY device upon receiving an indication that the remote system no longer receives any traffic or indications after interrupting the transmission,
(5) to buffer egress traffic received after receiving an indication of an upcoming new connection with a PHY device,
(6) to transmit indications that no traffic or indications are received after receiving the indication of the upcoming new connection with a PHY device and no traffic or indications has been received, and
(7) to transmit empty-traffic indications for a predetermined time interval before starting to transmit the buffered traffic towards the remote system, after receiving traffic or indications following receiving the indication of the upcoming new connection with a PHY device; and
a plurality of communication ports (920) configured to enable communication with the PHY device.

21. A method (1100) for switching a physical (PHY) device of a system linked via a communication media to a remote system, from being connected to a first processing (MAC) device to being connected to a second processing (MAC) device, the method comprising:
receiving (S1110) an indication of an upcoming change of connection by the first MAC device and the second MAC device;
after the receiving of the indication, buffering (S1120) egress traffic in the second MAC device;
transmitting (S1130) egress traffic buffered in the first MAC device prior to the receiving of the indication, via the PHY device and the communication media, to the remote system;
sending (S1140) a pause message requesting no ingress traffic to be sent from the remote system (801) for a first predetermined amount of time, from the first MAC device, to the remote system via the first PHY device, while continuing to receive ingress traffic or of empty-traffic indications by the first MAC device from the remote system via the PHY device;
transmitting (S1150) empty-traffic indications for a second predetermined amount of time after sending the pause message, from the first MAC device, towards the remote system via the first PHY device, while the remote system finishes sending an in-flight packet and then starts sending empty-traffic indications for the first predetermined amount of time towards the system, via the communication media and the PHY device;
after the second predetermined amount of time, interrupting (S1160) a transmission line from the first MAC device to the PHY device and connecting a transmission line of the second MAC device to the PHY device, while a reception line of the first MAC device remains connected to receive empty-traffic or no-remote-traffic indications from the remote system via the PHY device;
upon receiving (S1170) a no-remote-traffic indication from the remote system, interrupting, in the first MAC device, a reception line to the PHY device, and connecting a reception line of the second MAC device to the PHY device enabling the second MAC device to receive traffic and indications from the remote system;
upon receiving a no-remote-traffic indication from the remote system, sending (S1180) empty-traffic indications towards the remote device from the second MAC device, via the PHY device;
validating (S1190) a connection between the second MAC device and the PHY device, by transmitting and receiving empty-traffic indications towards and from the remote system via the PHY device, for at least a third predetermined time interval; and transmitting (S1200) the buffered egress traffic from the second MAC device via the PHY device and the communication media, to the remote system after the validating.

22. The method of claim 21, wherein the PHY device, the first MAC device, and the second MAC device are connected to a reconfigurable crossbar.

23. The method of claim 22, wherein the reconfigurable crossbar is an optical crossbar, and the method further includes converting electrical signals corresponding to ingress or egress traffic and indications into and from optical signals before being communicated between the PHY device and the first MAC device or the second MAC device via the optical crossbar.

24. The method of claim 21, wherein the first predetermined amount of time exceeds a maximum transmission unit used during communication between the system and the remote system.

25. The method of claim 21, wherein the second predetermined amount of time is larger than a maximum transmission unit used during communication between the system and the remote system but smaller than the first predetermined amount of time.

26. The method of claim 21, wherein the no-remote traffic indication is a "Remote Fault" (RF) message issued by one of the first MAC device, the second MAC device or received from the remote system when no traffic or indication is received for a receipt-error time interval.

27. A system (800) connected to a remote system (801) via a communication media (810), comprising:
   a physical (PHY) device (820) connected to the communication media (801) and configured (1) to forward egress traffic and indications received from a first MAC device (830) or from a second MAC device (840), towards the remote system (801), via the communication media (810), and (2) to forward ingress traffic and indications received from the remote system (801), via the communication media (810), towards the first MAC device (830) or the second MAC device (840);
   the first MAC device (830) initially connected to the PHY device (820) and configured to buffer and forward egress traffic and indications to be transmitted to the remote system (801), via the PHY device (820), and to receive ingress traffic and indications from the remote system (801) via the PHY device (820);
   the second MAC device (840) to be connected to the PHY device (820), and configured to buffer and forward egress traffic and indications to be transmitted to the remote system (801) via the PHY device (820), and to receive ingress traffic and indications from the remote system (801) via the PHY device (820);
   a switch (825) connected to the PHY device (820), the first MAC device (830), and the second MAC device (840) and configured to initially provide a first physical connection between the PHY device and the first MAC device, and then to provide a second physical connection between the PHY device and the second MAC device; and
   a controller (850) connected at least temporarily to the first MAC device (830), to the second MAC device (840), and to the switch (825) and configured to control the first MAC device (830), the second MAC device (840) and the switch (825) while the system (800) switches from having the PHY device (820) connected to the first MAC device (830), to having the PHY device (820) connected to the second MAC device (840), by (1) sending an indication of an upcoming change of connection to the first MAC device (830) and the second MAC device (840),
(2) redirecting egress traffic of the system (800) from the first MAC device (830) to the second MAC device (840) after sending the indication,
(3) controlling the first MAC device (830)
   a. to transmit egress traffic buffered in the first MAC device (830) prior to receiving the indication of the upcoming change of connection, via the PHY device (820) and the communication media (810), to the remote system (801), after receiving the indication,
   b. to send a pause message requesting no ingress traffic for a first predetermined amount of time to the remote system (801), while continuing to receive ingress traffic or empty-traffic indications from the remote system (801) via the PHY device (820), and
   c. to transmit empty-traffic indications for a second predetermined amount of time after sending the pause message towards the remote system (801) via the first PHY device (820),
(4) controlling the second MAC device (840)
   a. to buffer the egress traffic therein, after receiving the indication of the upcoming change of connection,
   b. to transmit no-remote-traffic indications until receiving a no-remote-traffic indication from the remote system (801),
   c. to validate communication with the remote system (801) via the PHY device (820) by transmitting and receiving empty-traffic indications for at least a predetermined time interval, after receiving the no-remote-traffic indication from the remote system (801) via the PHY device (820), and
   d. to transmit the buffered traffic via the PHY device (820) and the communication media (810) to the remote system (801), after the communication has been validated, and
(5) controlling a switch (825)
   a. to interrupt a transmission line between the first MAC device (830) and the PHY device (820) and to connect a new transmission line between the second MAC device (840) and the PHY device (820) after the second predetermined has elapsed, and
   b. to interrupt a reception line between the first MAC device (830) and the PHY device (820) and to connect a new reception line between the second MAC device (840) and the PHY device (820) when a no-remote-traffic indication is received from the remote system (801).

28. The system of claim 27, wherein the switch is a reconfigurable crossbar.

29. The system of claim 28, wherein the reconfigurable crossbar is an optical crossbar.

30. The system of claim 29, further comprising:
   a first optical engine device connected between the first MAC device and the optical crossbar and configured to convert electrical signals corresponding to traffic and indications to and from the first MAC device, into and from optical signals;
   a second optical engine device connected between the second MAC device and the optical crossbar and configured to convert electrical signals corresponding to traffic and indications to and from the second MAC device, into and from optical signals; and
   a PHY optical engine device connected between the PHY device and the optical crossbar and configured to convert electrical signals corresponding to traffic and indications to and from the PHY device, into and from optical signals.

31. The system of claim 27, wherein the PHY device is configured to be connected to the remote system via the communication media according to an Ethernet communication protocol.

32. The system of claim 31, wherein the Ethernet communication protocol enables one of a 10 Gbps, 40 Gbps and 100 GBps speed.

33. The system of claim 27, wherein the first MAC device and the second MAC device are located on different blades of a processing blade block, and the PHY device is located on an I/O blade of a media bridge block.

34. The system of claim 33, wherein the system further comprises a crossbar switch connected between the processing blade block and the media bridge.

35. The system of claim 34, wherein the crossbar switch is an optical crossbar and the system further comprises optical engines located on the blades on which the first MAC device, the second MAC device and the PHY device are respectively located, the optical engines being connected between a respective device and the optical crossbar and being configured to convert electrical signals corresponding to traffic and indications to and from the respective device, into or from optical signals.

36. A MAC device (900) useable in a system (800) communicating with a remote system (801), comprising:
a processor (910) configured
(1) to receive an indication of an upcoming change of connection related to an existing connection of the MAC device with a PHY device of the system,
(2) to transmit egress traffic buffered prior to receiving the indication of the upcoming change, via the PHY device to the remote system,
(3) to send a pause message requesting no ingress traffic to be sent from the remote system (801) for a first predetermined amount of time while continuing to receive ingress traffic or of empty-traffic indications from the remote system via the PHY device,
(4) to transmit empty-traffic indications for a second predetermined amount of time after sending the pause message, towards the remote system via the first PHY device,
(5) to interrupt transmission towards the first PHY device, while continuing reception of ingress traffic or of an empty-traffic indication after the second predetermined amount of time,
(6) to interrupt reception from the PHY device upon receiving no-remote-traffic indication from the remote system,
(7) to buffer egress traffic received after receiving an indication of an upcoming new connection with a PHY device,
(8) to transmit no-remote-traffic indications after receiving the indication of the upcoming new connection with a PHY device and until traffic or indications are received, and
(9) after receiving traffic or indications from the remote system via the PHY device following the indication of the upcoming new connection with the PHY device, to validate the new connection by transmitting empty-traffic indications for a third predetermined time interval, before starting to transmit the buffered traffic towards the remote system; and
a plurality of communication ports (920) configured to enable communication with the PHY device.

* * * * *

UNITED STATES PATENT AND TRADEMARK OFFICE
CERTIFICATE OF CORRECTION

PATENT NO. : 8,509,616 B2
APPLICATION NO. : 13/165978
DATED : August 13, 2013
INVENTOR(S) : Julien et al.

Page 1 of 2

It is certified that error appears in the above-identified patent and that said Letters Patent is hereby corrected as shown below:

In the Drawings

In Fig. 3, Sheet 3 of 17, for Tag "156", in Line 1, delete "XGMI" and insert -- XGMII --, therefor.

In Fig. 8, Sheet 8 of 17, for Tag "440", in Line 1, delete "(PDA)" and insert -- (PMA) --, therefor.

In Fig. 8, Sheet 8 of 17, for Tag "435", in Line 1, delete "(PDA-PMD)" and insert -- (PDA-PMA) --, therefor.

In Fig. 12, Sheet 12 of 17, for Tag "S790", in Line 2, delete "Other" and insert -- other --, therefor.

In Fig. 16A, Sheet 16 of 17, for Tag "S1150", in Line 3, delete "on-fly" and insert -- in-flight --, therefor.

In the Specification

In Column 6, Line 25, delete "1000" and insert -- 100G --, therefor.

In Column 8, Line 62, delete "XAUI 157," and insert -- XAUI 154, --, therefor.

In Column 9, Line 25, delete "1000" and insert -- 100G --, therefor.

In Column 9, Line 27, delete "1000" and insert -- 100G --, therefor.

In Column 9, Line 42, delete "1000" and insert -- 100G --, therefor.

In Column 10, Line 43, delete "blades 510," and insert -- blades 520, --, therefor.

Signed and Sealed this
Twenty-second Day of April, 2014

Michelle K. Lee
*Deputy Director of the United States Patent and Trademark Office*

CERTIFICATE OF CORRECTION (continued)
U.S. Pat. No. 8,509,616 B2

In Column 10, Line 44, delete "blades 520 and I/O blades 530." and insert -- blades 530 and I/O blades 510. --, therefor.

In Column 16, Line 5, delete "media 801," and insert -- media 810, --, therefor.

In Column 21, Line 15, delete "media 801" and insert -- media 810 --, therefor.

In Column 22, Line 48, delete "Gbps," and insert -- 10 Gbps, --, therefor.

In Column 22, Line 49, delete "GBps" and insert -- Gbps --, therefor.

In the Claims

In Column 27, Line 33, in Claim 16, delete "GBps" and insert -- Gbps --, therefor.

In Column 31, Line 10, in Claim 32, delete "GBps" and insert -- Gbps --, therefor.